US012683801B2

(12) United States Patent
Gissin et al.

(10) Patent No.: US 12,683,801 B2
(45) Date of Patent: Jul. 14, 2026

(54) ACCESS OBJECT AUTHENTICATION METHOD AND APPARATUS, AND SYSTEM

(71) Applicant: Huawei Technologies Co., Ltd., Shenzhen (CN)

(72) Inventors: Victor Gissin, Hod Hasharon (IL); Peng Wang, Shenzhen (CN); Feng Wang, Shenzhen (CN); Elena Gurevich, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

(21) Appl. No.: 18/754,882

(22) Filed: Jun. 26, 2024

(65) Prior Publication Data

US 2024/0348452 A1 Oct. 17, 2024

Related U.S. Application Data

(63) Continuation of application No. PCT/CN2022/142184, filed on Dec. 27, 2022.

(30) Foreign Application Priority Data

Dec. 27, 2021 (CN) .......................... 202111607112.X
Mar. 22, 2022 (CN) .......................... 202210304739.6

(51) Int. Cl.
*H04L 9/32* (2006.01)
*G06F 9/455* (2018.01)
(Continued)

(52) U.S. Cl.
CPC ........ *H04L 9/3242* (2013.01); *G06F 9/45558* (2013.01); *G06F 2009/45587* (2013.01); *G06F 2009/45591* (2013.01)

(58) Field of Classification Search
CPC ............... H04L 9/3242; G06F 9/45558; G06F 2009/45587; G06F 2009/45591;
(Continued)

(56) References Cited

U.S. PATENT DOCUMENTS

| 6,226,749 B1 * | 5/2001 | Carloganu | ............ G06F 21/606 |
| | | | 726/2 |
| 9,288,208 B1 * | 3/2016 | Roth | ................... H04L 63/0807 |

(Continued)

FOREIGN PATENT DOCUMENTS

WO          WO-9705551 A1 *    2/1997    ........... G06F 21/606

OTHER PUBLICATIONS

Anonymous Infosec: "InfoSec Musings: What's the difference between a Virtual Machine and a Container?", Apr. 27, 2015, XP093215443, 3 pages, The Wayback Machine Retrieved from the Internet: URL:https://web.archive.org/web/20201108132051/https://security-musings.blogspot.com/2015/04/whats-difference-between-virtual.html.

(Continued)

*Primary Examiner* — Berhanu Shitayewoldetadik
(74) *Attorney, Agent, or Firm* — Conley Rose, P.C.

(57) ABSTRACT

An access object authentication method includes a trusted component that is in a computing device and that completes an access object authentication process. When a client requests to access a target object, the trusted component receives an object identifier (ID) and an authentication ID of the target object from the client to perform, based on the authentication ID, tenant authentication on a tenant to which the client belongs. When the authentication on the tenant to which the client belongs succeeds, the trusted component accesses a storage device based on the object ID of the target object.

19 Claims, 9 Drawing Sheets

(51) Int. Cl.

| | |
|---|---|
| *G06F 11/00* | (2006.01) |
| *G06F 11/10* | (2006.01) |
| *G06F 21/31* | (2013.01) |
| *G06F 21/60* | (2013.01) |
| *H04L 9/00* | (2022.01) |
| *H04L 15/16* | (2006.01) |
| *H04L 29/06* | (2006.01) |
| *H04L 29/08* | (2006.01) |

(58) Field of Classification Search
CPC .. G06F 3/067; G06F 21/53; G06F 2221/2141;
G06F 21/31; G06F 21/60; G06F 21/604;
G06F 21/62; G06F 21/6218; G06F 21/57
USPC ........................................................ 713/155
See application file for complete search history.

(56) References Cited

U.S. PATENT DOCUMENTS

| | | | |
|---|---|---|---|
| 9,565,019 B1 | 2/2017 | O'connell | |
| 9,864,773 B1* | 1/2018 | Feldman | G06F 3/0679 |
| 2003/0037237 A1* | 2/2003 | Abgrall | H04L 63/062 |
| | | | 713/166 |
| 2005/0235148 A1* | 10/2005 | Scheidt | G06Q 20/3829 |
| | | | 713/168 |
| 2012/0030472 A1* | 2/2012 | Chai | H04L 9/3236 |
| | | | 713/181 |
| 2013/0305348 A1* | 11/2013 | Silverstone | G06F 21/554 |
| | | | 718/1 |
| 2014/0013423 A1* | 1/2014 | Jain | G06F 21/31 |
| | | | 726/19 |
| 2014/0330869 A1* | 11/2014 | Factor | G06F 21/6281 |
| | | | 707/783 |
| 2014/0330936 A1* | 11/2014 | Factor | H04L 63/0281 |
| | | | 709/219 |
| 2016/0226834 A1* | 8/2016 | Dawson | H04L 63/0428 |
| 2017/0091467 A1* | 3/2017 | Pogorelik | G06F 21/645 |
| 2017/0277754 A1* | 9/2017 | Terao | G06F 16/2379 |
| 2018/0041336 A1 | 2/2018 | Keshava et al. | |
| 2018/0075250 A1* | 3/2018 | Chasman | G06F 16/986 |
| 2018/0091308 A1* | 3/2018 | Durham | H04L 9/3242 |
| 2020/0007529 A1* | 1/2020 | Bahrenburg | H04L 63/08 |
| 2020/0242267 A1* | 7/2020 | Weiss | H04L 9/083 |
| 2020/0257794 A1* | 8/2020 | Kim | G06F 21/606 |
| 2020/0356414 A1 | 11/2020 | Sindhu et al. | |
| 2020/0394061 A1* | 12/2020 | Sekar | G06F 16/252 |
| 2021/0004172 A1* | 1/2021 | Shimmitsu | G06F 3/0649 |
| 2021/0089357 A1* | 3/2021 | Garaga | G06F 16/23 |
| 2021/0263757 A1 | 8/2021 | Tsirkin | |
| 2021/0374233 A1* | 12/2021 | Bursell | H04L 9/3242 |
| 2022/0342755 A1* | 10/2022 | Vedpathak | G06F 21/645 |

OTHER PUBLICATIONS

Server-side development, "Permission control for multi-tenant system design," Mar. 13, 2020, 5 pages.

* cited by examiner

ACCESS OBJECT AUTHENTICATION METHOD AND APPARATUS, AND SYSTEM

CROSS-REFERENCE TO RELATED APPLICATIONS

This is a continuation of International Patent Application No. PCT/CN2022/142184 filed on Dec. 27, 2022, which claims priority to Chinese Patent Application No. 202210304739.6 filed on Mar. 22, 2022 and Chinese Patent Application No. 202111607112.X filed on Dec. 27, 2021. All of the aforementioned patent applications are hereby incorporated by reference in their entireties.

TECHNICAL FIELD

This disclosure relates to the field of data security technologies, and in particular, to an access object authentication method and apparatus, and a system.

BACKGROUND

A multi-tenant technology, also referred to as a multi-tenancy technology, is mainly used to share a same system or program component in a multi-user environment and ensure data isolation and security between users. In cloud computing, a tenant usually refers to a customer of a system or a platform, and a series of data that is created and used by the customer, for example, an account, statistics, user data, a customized application program environment, and used computing, network, and storage resources. The system or the platform serves a plurality of tenants at the same time. Therefore, a service provider needs to ensure that the plurality of tenants do not affect each other and ensure that data of each tenant is secure and is not obtained or even tampered with by another tenant. In one technology, to support multi-tenant data isolation, a service usually performs tenant authentication based on an access instruction that is sent by a client for an object (a form of data encapsulation), to determine whether a tenant to which the client belongs has permission to access the object. For example, the service provider stores a table of a mapping relationship between a tenant and an object that can be accessed by the tenant in a system. When receiving an access instruction sent by a client of the tenant, the service provider performs, by querying the mapping relationship table and based on tenant information and object information that are carried in the access instruction, tenant authentication on the tenant to which the client belongs, to determine whether the tenant to which the client belongs has permission to access the object. However, in the foregoing method, because there is a large quantity of tenants, and each tenant can access a large quantity of objects, to record an object that can be accessed by each tenant, the service provider needs to dynamically maintain a huge mapping relationship table. Consequently, resource consumption of the service provider is high, and running efficiency of the service provider is affected.

SUMMARY

This disclosure provides an access object authentication method and apparatus, and a system, to improve object access efficiency while ensuring multi-tenant data isolation and security. The technical solutions are as follows.

According to a first aspect, an access object authentication method is provided. The method includes the following.

A trusted component in a computing device receives an object identifier (ID) and an authentication ID of a target object from a client in the computing device.

The trusted component performs tenant authentication based on the authentication ID. When authentication on a tenant to which the client belongs succeeds, the trusted component sends an access instruction for accessing the target object to a storage device, where the access instruction includes the object ID of the target object.

The target object is any object stored in the storage device. For any object stored in the storage device, an ID of the object is referred to as an object ID. In an implementation of this disclosure, an object is also referred to as a data object, and is an element of any data structure referenced in an application program in which a service is run, for example, a file, data, or a variable. A data type of an object is not limited in this disclosure. For example, the object is data of a text type, for example, a travel record, a consumption record, or a sent message, or the object is of an image type or an audio type, or the object is data of a web page type.

It should be noted that, in this disclosure, the object ID of the target object may be an encrypted object ID, or may be an unencrypted object ID. When the object ID of the target object is the unencrypted object ID, the object ID of the target object may be understood as an original object ID of the target object. For any object stored in the storage device, the object corresponds to a unique original object ID.

In addition, in the foregoing process, a process in which the trusted component sends the access instruction to the storage device includes direct sending (without forwarding via an intermediate component) and indirect sending (with forwarding via an intermediate component). For example, when the trusted component is a data processing unit (DPU), the trusted component directly sends the access instruction to the storage device. For another example, when the trusted component is implemented by software, the trusted component indirectly sends the access instruction to the storage device by using a central processing unit (CPU) or another chip. This is not limited. An optional form of the trusted component is described subsequently, and details are not described herein.

In the foregoing manner, the trusted component in the computing device completes an access object authentication process. When the client requests to access the target object, the trusted component receives the object ID and the authentication ID of the target object from the client, to perform, based on the authentication ID, tenant authentication on the tenant to which the client belongs. When the authentication on the tenant to which the client belongs succeeds, the trusted component accesses the storage device based on the object ID of the target object, so that the storage device does not need to perform tenant authentication. This reduces resource overheads and a calculation amount of the storage device, and improves object access efficiency while ensuring multi-tenant data isolation and security.

In an implementation, the object ID received by the trusted component from the client is an encrypted object ID, and the object ID included in the access instruction is a decrypted object ID. The method further includes the following.

The trusted component decrypts the encrypted object ID received from the client, to obtain the decrypted object ID used to generate the access instruction.

Because the object ID received by the trusted component is the encrypted object ID, the object ID used to access the storage device can be obtained only after being decrypted, to ensure security of the object ID.

In an implementation, the encrypted object ID is provided by the storage device for the client, and the client does not have a key used for decryption. Therefore, the client cannot obtain the original object ID, and cannot tamper with the object ID, to improve security.

In an implementation, the authentication ID cannot be changed by the client.

The authentication ID uniquely identifies the client, and is delivered by hardware in the computing device. Therefore, the client cannot tamper with the authentication ID, so that the trusted component can perform, based on the authentication ID, tenant authentication on the tenant to which the client belongs, to ensure multi-tenant data isolation and security.

In an implementation, the client is run in a virtual machine (VM) in the computing device or a container in the computing device.

The computing device runs the client based on a VM technology or a container technology, to provide technical support for multi-tenant data isolation and security.

In an implementation, the trusted component is any one of the following: a DPU, a VM monitor (hypervisor) that is run in at least one CPU, and a trusted execution environment (TEE) that is run in the at least one CPU.

The trusted component can be implemented in any one of the foregoing forms, to ensure that the client cannot change an operation of the trusted component, and ensure multi-tenant data isolation and security.

In an implementation, the trusted component is a DPU, and the authentication ID is a virtual function (VF) ID of a VF provided by the DPU for the tenant to which the client belongs.

In an implementation, the client is run in a VM, the authentication ID is a VM ID of the VM, and the authentication ID received by the trusted component from the client is added by the VM, or the client is run in a container, the authentication ID is a container ID of the container, and the authentication ID received by the trusted component from the client is added by the container.

In an implementation, the trusted component further receives a tenant ID from the client. The step of performing, by the trusted component, tenant authentication based on the authentication ID includes the following.

The trusted component queries for a tenant ID corresponding to the authentication ID, and when the found tenant ID matches the tenant ID received by the trusted component from the client, the authentication succeeds.

In the foregoing manner, when the trusted component further receives the tenant ID from the client, because the authentication ID cannot be changed by the client, the trusted component can query for a real tenant ID of the client based on the authentication ID, and compare the found real tenant ID with the tenant ID received from the client, to implement an authentication process, so as to ensure multi-tenant data isolation and security.

In one technology, a correspondence between a tenant ID and an object ID needs to be stored in the storage device. Because a quantity of object IDs is very large, a data amount of the correspondence is also very large. This manner not only occupies a large amount of storage space of the storage device, but also has low efficiency of determining permission of a tenant for an object. In this disclosure, permission of the tenant can be determined by comparing only two tenant IDs. Therefore, an amount of data stored for authentication is greatly reduced, an amount of queried data is greatly reduced, and query efficiency is improved. In addition, a query process is performed by the computing device (instead of the storage device). This further saves the storage space of the storage device and reduces occupation of running resources of the storage device.

In an implementation, the trusted component further receives a first message authentication code (MAC) from the client. The step of performing, by the trusted component, tenant authentication based on the authentication ID includes the following.

The trusted component queries for a key corresponding to the authentication ID.

The trusted component generates a second MAC, where the second MAC is related to the found key and the object ID of the target object that is received from the client.

When the first MAC matches the second MAC, the authentication succeeds.

In the foregoing manner, when the trusted component further receives the first MAC from the client, because the authentication ID cannot be changed by the client, the trusted component can query, based on the authentication ID, for a real key of the tenant to which the client belongs, generate the second MAC based on the found real key, and compare the second MAC with the first MAC received from the client, to implement an authentication process. This ensures multi-tenant data isolation and security. In addition, in a manner of using the authentication ID, the storage device does not need to store a correspondence between a tenant ID and an object ID. Therefore, storage space required for authentication is greatly reduced, an amount of queried data is greatly reduced, and query efficiency is improved. In addition, a query process is performed by the computing device (instead of the storage device). This further saves storage space of the storage device and reduces occupation of running resources of the storage device.

In an implementation, the method further includes the following.

The storage device generates the first MAC, where the first MAC is related to the key recorded by the storage device and the object ID of the target object that is recorded by the storage device.

The storage device sends the first MAC to the client.

In the foregoing manner, the storage device generates the first MAC, and sends the first MAC to the client, so that the trusted component performs tenant authentication when receiving the first MAC from the client, to ensure multi-tenant data isolation and security.

In an implementation, the object ID received by the trusted component from the client is an unencrypted object ID. The method further includes the following.

The storage device creates an object ID of the target object.

The storage device sends the object ID of the target object to the client.

In an implementation, the object ID received by the trusted component from the client is an encrypted object ID. The step of sending, by the trusted component, an access instruction for accessing the target object to the storage device includes the following.

The trusted component decrypts the encrypted object ID to obtain a decrypted object ID.

The trusted component generates the access instruction, where the access instruction includes the decrypted object ID.

The trusted component sends the access instruction to the storage device.

In this process, the decrypted object ID may also be understood as the original object ID of the target object.

In an implementation, the step of decrypting, by the trusted component, the encrypted object ID received from the client includes the following.

The trusted component queries for a key corresponding to the authentication ID.

The trusted component decrypts, by using the key, the encrypted object ID received from the client.

In an implementation, the object ID received by the trusted component from the client is an encrypted object ID. The method further includes the following.

The storage device creates an object ID of the target object, and encrypts the object ID of the target object to generate an encrypted object ID.

The storage device sends the encrypted object ID to the client.

In the foregoing manner, the storage device encrypts the created object ID of the target object to obtain the encrypted object ID, so that the client can access the storage device only by using the encrypted object ID, and the client cannot know a real original object ID. Therefore, the client can be prevented from maliciously accessing the storage device by forging the object ID, to improve multi-tenant data isolation and security.

In an implementation, the object ID received by the trusted component from the client is an encrypted object ID, the object ID included in the access instruction is a decrypted object ID, and a length of the encrypted object ID is the same as a length of the decrypted object ID.

In this manner, the length of the encrypted object ID and the length of the decrypted object ID are set to be the same, an application programming interface (API) of the client in the computing device does not need to be changed, and applicability of the access object authentication method is extended.

According to a second aspect, an implementation of this disclosure provides an access object authentication apparatus. The apparatus includes a receiving module configured to receive an object ID and an authentication ID of a target object from a client in a computing device, and an authentication module configured to perform tenant authentication based on the authentication ID, and when authentication on a tenant to which the client belongs succeeds, send an access instruction for accessing the target object to a storage device, where the access instruction includes the object ID of the target object.

In an implementation, the object ID received by the apparatus from the client is an encrypted object ID, and the object ID included in the access instruction is a decrypted object ID, and the apparatus further includes a decryption module configured to decrypt the encrypted object ID received from the client, to obtain the decrypted object ID used to generate the access instruction.

In an implementation, the authentication ID cannot be changed by the client.

In an implementation, the client is run in a VM in the computing device or a container in the computing device.

In an implementation, the apparatus is used in any one of the following: a DPU, a hypervisor that is run in at least one CPU, and a TEE that is run in the at least one CPU.

In an implementation, the apparatus is used in a DPU, and the authentication ID is a VF ID of a VF provided by the DPU for the tenant to which the client belongs.

In an implementation, the client is run in a VM, the authentication ID is a VM ID of the VM, and the authentication ID received by the apparatus from the client is added by the VM, or the client is run in a container, the authentication ID is a container ID of the container, and the authentication ID received by the apparatus from the client is added by the container.

In an implementation, the apparatus further receives a tenant ID from the client, and the authentication module is configured to query for a tenant ID corresponding to the authentication ID, and when the found tenant ID matches the tenant ID received by the apparatus from the client, the authentication succeeds.

In an implementation, the apparatus further receives a first MAC from the client, and the authentication module is configured to query for a key corresponding to the authentication ID, generate a second MAC, where the second MAC is related to the found key and the object ID of the target object that is received from the client, and when the first MAC matches the second MAC, the authentication succeeds.

In an implementation, the decryption module is configured to query for a key corresponding to the authentication ID, and decrypt, by using the key, the encrypted object ID received from the client.

It should be understood that the foregoing access object authentication apparatus can implement a function similar to that of the trusted component in the method described in the first aspect, and has corresponding beneficial effects.

According to a third aspect, an implementation of this disclosure provides a DPU. The DPU includes a processing chip and an interface. The interface is configured to receive an instruction from a client in a computing device, and send the instruction to a storage device. The processing chip is configured to implement a function of a trusted component in the computing device according to any one of the first aspect or the possible implementations of the first aspect.

According to a fourth aspect, an implementation of this disclosure provides a computing device. The computing device includes at least one processor and at least one DPU. The at least one processor is configured to implement a function of a client in the computing device according to any one of the first aspect or the possible implementations of the first aspect. The at least one DPU is configured to implement a function of a trusted component in the computing device according to any one of the first aspect or the possible implementations of the first aspect.

According to a fifth aspect, an implementation of this disclosure provides a computing device. The computing device includes at least one processor and a memory. The memory is configured to store program code. The at least one processor is configured to invoke the program code to implement a function of the computing device according to any one of the first aspect or the possible implementations of the first aspect.

According to a sixth aspect, an implementation of this disclosure provides an object storage system. The object storage system includes a computing device and a storage device. The computing device is configured to implement a function of the computing device according to any one of the first aspect or the possible implementations of the first aspect. The storage device is configured to implement a function of the storage device according to any one of the first aspect or the possible implementations of the first aspect.

According to a seventh aspect, an implementation of this disclosure provides a computer-readable storage medium. The computer-readable storage medium is configured to store program code. The program code is used to implement a function of the computing device according to any one of the first aspect or the possible implementations of the first aspect, or implement a function of the storage device according to any one of the first aspect or the possible implementations of the first aspect. The storage medium includes but is not limited to a volatile memory, for example, a random-access memory (RAM), or a non-volatile memory, for example, a flash memory, a hard disk drive (HDD), or a solid-state drive (SSD).

According to an eighth aspect, an implementation of this disclosure provides a computer program product. When the computer program product runs on a computing device, the computing device is enabled to implement a function of the computing device according to any one of the first aspect or the possible implementations of the first aspect, or when the computer program product runs on a storage device, the storage device is enabled to implement a function of the storage device according to any one of the first aspect or the possible implementations of the first aspect. The computer program product may be a software installation package. When the function of the foregoing computing device or storage device needs to be implemented, the computer program product may be downloaded and executed on the computing device.

DESCRIPTION OF EMBODIMENTS

Figures 1, 2:
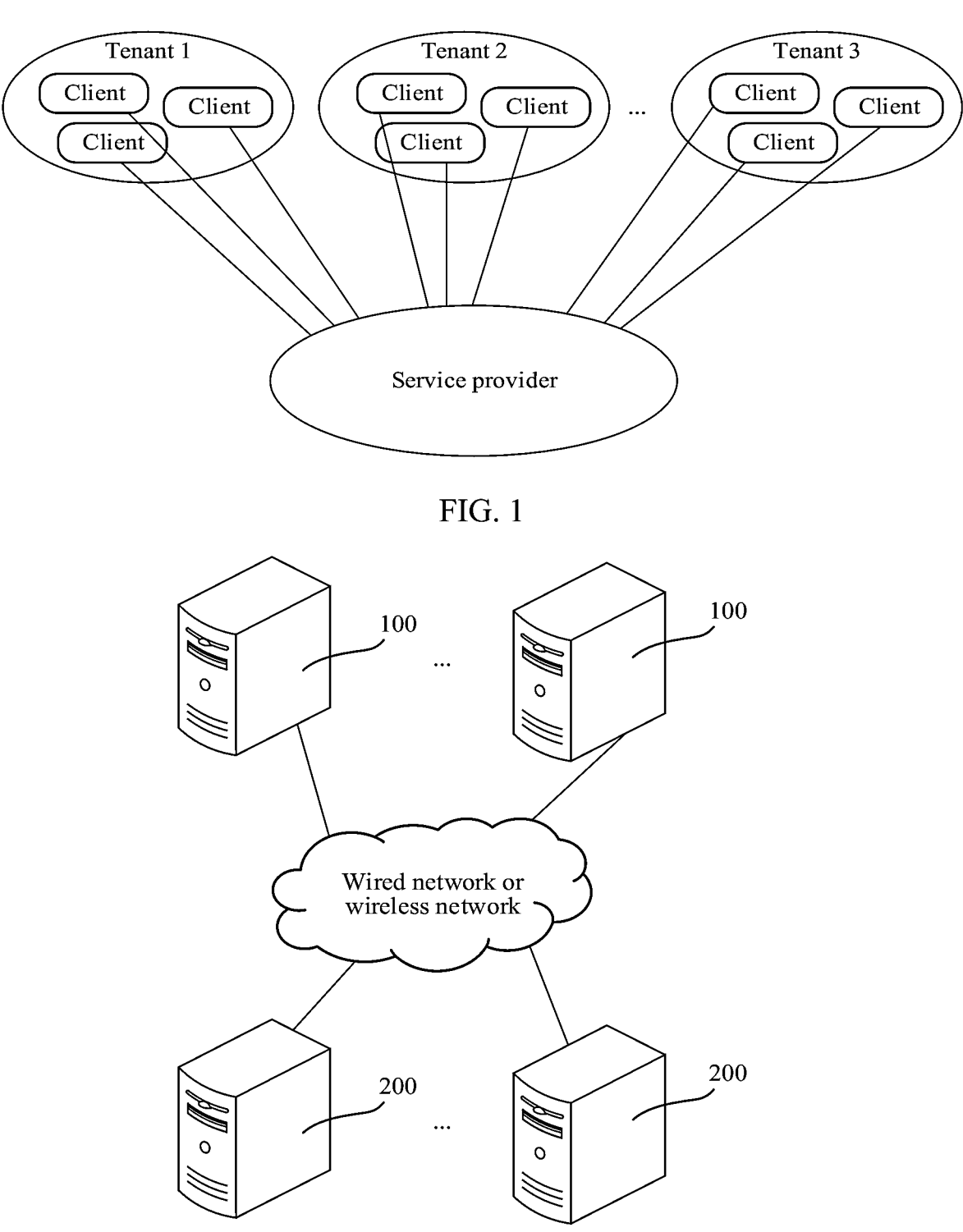
FIG. 1 is a diagram of an application scenario.
FIG. 2 is a diagram of an implementation environment.

To make the objectives, the technical solutions, and advantages of this disclosure clearer, the following further describes the implementations of this disclosure in detail with reference to the accompanying drawings.

For ease of understanding, the following first describes crucial terms and crucial concepts in this disclosure.

A multi-tenant technology, also referred to as a multi-tenancy technology, is mainly used to share a same system or program component in a multi-user environment and ensure data isolation between users. In some embodiments, a system supporting the multi-tenant technology needs to be designed to perform virtual partitioning on data and a configuration of the system, so that each tenant (or an organization) of the system can use an independent system instance, and each tenant can perform personalized configuration on a rented system instance according to a requirement of the tenant. According to the multi-tenant technology, a common part of the system can be shared, and a personalized part can be isolated separately.

In the multi-tenant technology, the tenant usually refers to a customer of a system or a platform, and a series of data that is created and used by the customer, for example, an account, statistics, user data, a customized application program environment, and used computing, network, and storage resources.

Object storage, also referred to as object-based storage, means that data is encapsulated into objects of "variable" sizes, and unique identifiers, namely, object IDs, are assigned to the objects.

A key-value storage system is a storage system that stores data in a form of key-value pairs. Any data A is used as an example. The data A is a value, and a unique identifier of the data A is a key.

A VM is a complete computer system that is simulated by using software, has a complete hardware system function, and is run in an entirely isolated environment. For example, all work that can be completed in a physical machine can be implemented in a VM. Each VM has an independent hard disk and an independent operating system, and a user may perform an operation on the VM as if the VM was the physical machine.

A container technology is a virtualization technology in which resources of a single operating system are divided into isolated groups to better balance conflicting resource usage requirements between the isolated groups.

A single-root input/output (I/O) virtualization (SR-IOV) technology is a hardware-based virtualization solution that can improve I/O performance and scalability. An SR-IOV standard allows efficient sharing of Peripheral Component Interconnect Express (PCIe) devices between VMs and the sharing is implemented in hardware.

It is defined in a PCIe standard that the PCIe device provides a service by using a VF.

A MAC is a small piece of information generated by using a specific algorithm in cryptography, and is used for data integrity check and identity authentication. For example, a symmetric key is used to detect whether data is accidentally or maliciously changed.

Authenticated encryption with associated data (AEAD) is a form of encryption with confidentiality, integrity, and authentication.

The following describes an application scenario of this disclosure.

The technical solutions provided in this disclosure can be applied to a system in which a data service is provided for a plurality of tenants based on a multi-tenant technology. For example, FIG. 1 is a diagram of an application scenario. As shown in FIG. 1, the application scenario is a system for providing a data service for a plurality of tenants. The system includes the plurality of tenants and a service provider. The service provider may be understood as an abstraction of a storage device in the system (which may also be understood as an abstraction of a data center or a storage node in the system). Each tenant corresponds to a plurality of clients. For example, the system stores data in an object storage manner. For any object stored in the system, the object can be accessed by only a plurality of clients of one tenant. When a client of any tenant sends an access instruction to the service provider to access an object, authentication is performed on whether the tenant to which the client belongs has permission to access the object, to prevent the tenant to which the client belongs from accessing data of another tenant, so as to ensure multi-tenant data isolation and security in the system.

Based on the foregoing application scenario, this disclosure provides an access object authentication method. A trusted component in a computing device completes an access object authentication process. When a client requests to access a target object, the trusted component receives an object ID and an authentication ID of the target object from the client, to perform, based on the authentication ID, tenant authentication on a tenant to which the client belongs. When the authentication on the tenant to which the client belongs succeeds, the trusted component accesses a storage device based on the object ID of the target object, so that the storage device does not need to perform tenant authentication. This reduces resource overheads and a calculation amount of the storage device, and improves object access efficiency while ensuring multi-tenant data isolation and security. The storage device may be a storage server, a storage controller, a distributed storage system, a disk enclosure, a public storage cloud, a private storage cloud, or the like. This is not limited. The storage device includes a storage medium such as a disk or an SSD. The storage device has a computing capability.

The following describes an implementation environment of this disclosure.

FIG. 2 is a diagram of an implementation environment. As shown in FIG. 2, the implementation environment includes an object storage system. The system can provide a data service for a plurality of tenants based on a multi-tenant technology. It should be noted that the object storage system is used as an example for description in embodiments of this disclosure. However, in some scenarios, the implementation environment may alternatively be a key-value storage system or the like. This is not limited in embodiments of this disclosure. It should be noted that, in some other scenarios, the implementation environment may alternatively be a file storage system, a block storage system, or the like based on an object storage technology (or a key-value storage technology). This is not limited in embodiments of this disclosure. For example, the object storage system includes a computing device 100 and a storage device 200. The computing device 100 and the storage device 200 are directly or indirectly connected through a wired network or a wireless network. This is not limited herein.

There may be a plurality of computing devices 100. Each computing device 100 includes at least one client, and one client belongs to one tenant. For any computing device 100, at least one client included in the computing device 100 may belong to a same tenant, or may belong to different tenants. One tenant may include a plurality of clients. This is not limited in embodiments of this disclosure. In some embodiments, the computing device 100 runs at least one client based on a VM or container technology. For example, at least one VM is run in the computing device 100, and one VM is configured to run one client. For another example, at least one container is run in the computing device 100, and one container is configured to run one client. In some embodiments, the computing device 100 is a device that has both a computing capability and a storage capability, for example, a server or a desktop computer.

The storage device 200 is configured to store at least one object, and each object can be accessed by only at least one client of a tenant. Each object corresponds to a unique original object ID. It should be noted that, an object in this disclosure is also referred to as a data object, and is an element of any data structure referenced in an application program in which a service is run, for example, a file, data, or a variable. A data type of an object is not limited in embodiments of this disclosure. For example, the object is data of a text type, for example, a travel record, a consumption record, or a sent message, or the object is of an image type or an audio type, or the object is data of a web page type. The storage device 200 may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. There may be more or fewer storage devices 200. This is not limited in embodiments of this disclosure.

In addition, a quantity of computing devices 100 and a quantity of storage devices 200 in the system shown in FIG. 2 are merely examples, and there may be more or fewer computing devices 100 and more or fewer storage devices 200. This is not limited.

In some embodiments, the foregoing wireless network or wired network uses a standard communication technology and/or protocol. A network includes but is not limited to any combination of a data center network, a storage area network (SAN), a local area network (LAN), a metropolitan area network (MAN), a wide area network (WAN), a mobile, wired, or wireless network, a private network, or a virtual private network. In some implementations, technologies and/or formats including a Hypertext Markup Language (HTML), an Extensible Markup Language (XML), and the like are used to represent data exchanged through the network. In addition, common encryption technologies such as a Secure Sockets Layer (SSL), Transport Layer Security (TLS), a virtual private network (VPN), and Internet Protocol (IP) Security (IPSec) can be used to encrypt all or some links. In some other embodiments, customized and/or dedicated data communication technologies can also be used to replace or supplement the foregoing data communication technologies.

The following describes hardware structures of the computing device and the storage device in the foregoing implementation environment.

Figure 3:
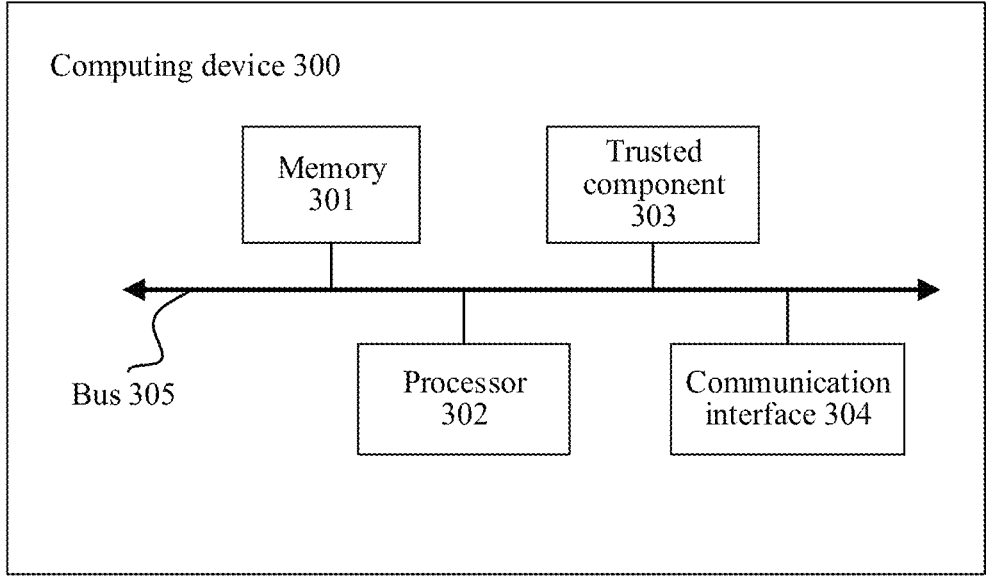
FIG. 3 is a diagram of a hardware structure of a computing device according to an embodiment of this disclosure.

FIG. 3 is a diagram of a hardware structure of a computing device according to an embodiment of this disclosure. As shown in FIG. 3, the computing device 300 includes a memory 301, a processor 302, a trusted component 303, a communication interface 304, and a bus 305. A communication connection between the memory 301, the processor 302, the trusted component 303, and the communication interface 304 is implemented through the bus 305.

The memory 301 is a read-only memory (ROM) or another type of static storage device that can store static information and instructions, a RAM or another type of dynamic storage device that can store information and instructions, or may be an electrically erasable programmable ROM (EEPROM), a compact disc (CD) ROM (CD-ROM) or another CD storage, an optical disc storage (including a compact optical disc, a laser disc, an optical disc, a DIGITAL VERSATILE DISC (DVD), a BLU-RAY disc, or the like), a magnetic disk storage medium or another magnetic storage device, or any other medium that can be used to carry or store expected program code in a form of instructions or a data structure and that can be accessed by a computer. However, the memory is not limited thereto. In some embodiments, the memory 301 is a double data rate synchronous dynamic RAM (DDR), a dynamic RAM (DRAM), or a storage class memory (SCM). The SCM is, for example, a non-volatile memory (NVM) or a phase-changeable memory (PCM). In some embodiments, the memory 301 includes one or more of the foregoing memories.

The processor 302 is a network processor (NP), a CPU, an application-specific integrated circuit (ASIC), or an integrated circuit configured to control program execution of the solutions of this disclosure. The processor 302 may be a single-core processor (single-CPU), or may be a multi-core processor (multi-CPU). There may be one or more processors 302. The processor 302 can run a VM and a container, and can further run a VM monitor (VMM). The VMM is also referred to as a hypervisor.

The memory 301 and the processor 302 may be disposed separately, or may be integrated together.

The trusted component 303 is a DPU. The DPU is a data-centric dedicated processor, and uses a software-defined technology to support infrastructure layer resource virtualization and infrastructure layer services such as storage, security, and service quality management. The DPU can improve running efficiency of the entire computing device and reduce costs. For example, the DPU serves as a storage entry, and localizes distributed storage and remote access. For example, in the computing device, storage protocol processing is offloaded in a DPU, to bypass a CPU for object access, reduce an I/O processing delay and CPU overheads in the computing device, and improve performance. In some cases, the DPU has a function of a network interface card and has a more powerful computing capability than a common network interface card. Therefore, the DPU is also referred to as an "intelligent network interface card".

In some embodiments, the trusted component 303 is a VMM, and is also referred to as a hypervisor. The hypervisor is a type of software, firmware, or hardware configured to create and execute a VM, and allows a plurality of operating systems and applications to share hardware. For example, the hypervisor is a "meta" operating system in a virtual environment, and can access all physical devices, including a disk and a memory, in the computing device. The hypervisor not only coordinates access to these hardware resources, but also protect VMs, for example, isolate operations of tenants to which clients in the computing device belong.

In some embodiments, the trusted component 303 is a TEE. The TEE is a secure area in the processor 302 (for example, a secure area in the CPU), and is run in an independent environment and is run in parallel with the operating system. For example, the TEE is implemented based on technologies such as an ARM trust zone and an Intel software guard extension (Intel SGX). For example, the processor 302 is the CPU. The CPU can ensure that confidentiality and integrity of code and data in the TEE are protected (in other words, the code and the data that are run in the TEE are confidential and cannot be tampered with), and a trusted application program that is run in the TEE can access all functions of the processor and the memory in the computing device.

It should be understood that the trusted component 303 shown in FIG. 3 is merely an example for description. In some embodiments, the trusted component 303 may alternatively be disposed at another location. For example, when the trusted component 303 is the TEE, the trusted component 303 is disposed in the processor 302. For another example, when the trusted component 303 is the hypervisor, the trusted component 303 is implemented by using a chip. In addition, in some scenarios, the trusted component 303 is implemented by using at least one segment of program code. This is not limited in embodiments of this disclosure. The trusted component in any one of the foregoing forms is disposed in the computing device, so that the operations of the tenants to which the clients in the computing device belong can be isolated, to ensure multi-tenant data isolation and security. Operation isolation means that the client cannot operate the trusted component, and an operation performed by the trusted component cannot be tampered with by the client. Therefore, the trusted component is "trustworthy".

The communication interface 304 uses a transceiver module such as a transceiver, to implement communication between the computing device 300 and another device or a communication network. The communication interface 304 is, for example, an external interface of a network interface card. For example, data is obtained through the communication interface 304.

The bus 305 may include a path for transmitting information between components (for example, the memory 301, the processor 302, the trusted component 303, and the communication interface 304) of the computing device 300. In some embodiments, the bus 305 is a PCIe based bus.

Figure 4:
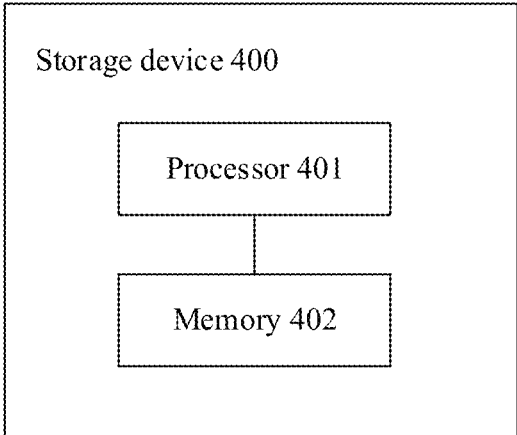
FIG. 4 is a diagram of a hardware structure of a storage device according to an embodiment of this disclosure.

FIG. 4 is a diagram of a hardware structure of a storage device according to an embodiment of this disclosure. As shown in FIG. 4, the storage device 400 may have a large difference due to different configurations or performance, and includes one or more processors 401 and one or more memories 402. The memory 402 stores at least one piece of program code, and the at least one piece of program code is loaded by the processor 401 to implement a function of the storage device in the following method embodiment. Certainly, the storage device 400 may further have components such as a wired or wireless network interface, a keyboard, and an input/output interface, to provide an input/output. The storage device 400 further includes another component configured to implement a device function. Details are not described herein.

Based on the object storage system provided in the embodiments of this disclosure, the following describes an access object authentication process provided in embodiments of this disclosure. For example, the access object authentication process provided in embodiments of this disclosure is applied to the object storage system shown in FIG. 2 to FIG. 4.

In the object storage system, for any object stored in the storage device, the storage device creates two object IDs for the object:

The first one is a common ID (or an original object ID or an unencrypted object ID) of the object, and is used inside the storage device, so that the storage device determines a storage address of the object based on the common ID.

The second one is a security ID (or a security object ID, or an external object ID, or an encrypted object ID) of the object, and is provided for the computing device to use, so that the computing device accesses the object based on the security ID. It should be understood that a new ID obtained by encrypting the common ID through a cryptographic operation is a security ID.

In embodiments of this disclosure, an object ID is a general term, and may be a common ID or a security ID.

Figure 5:
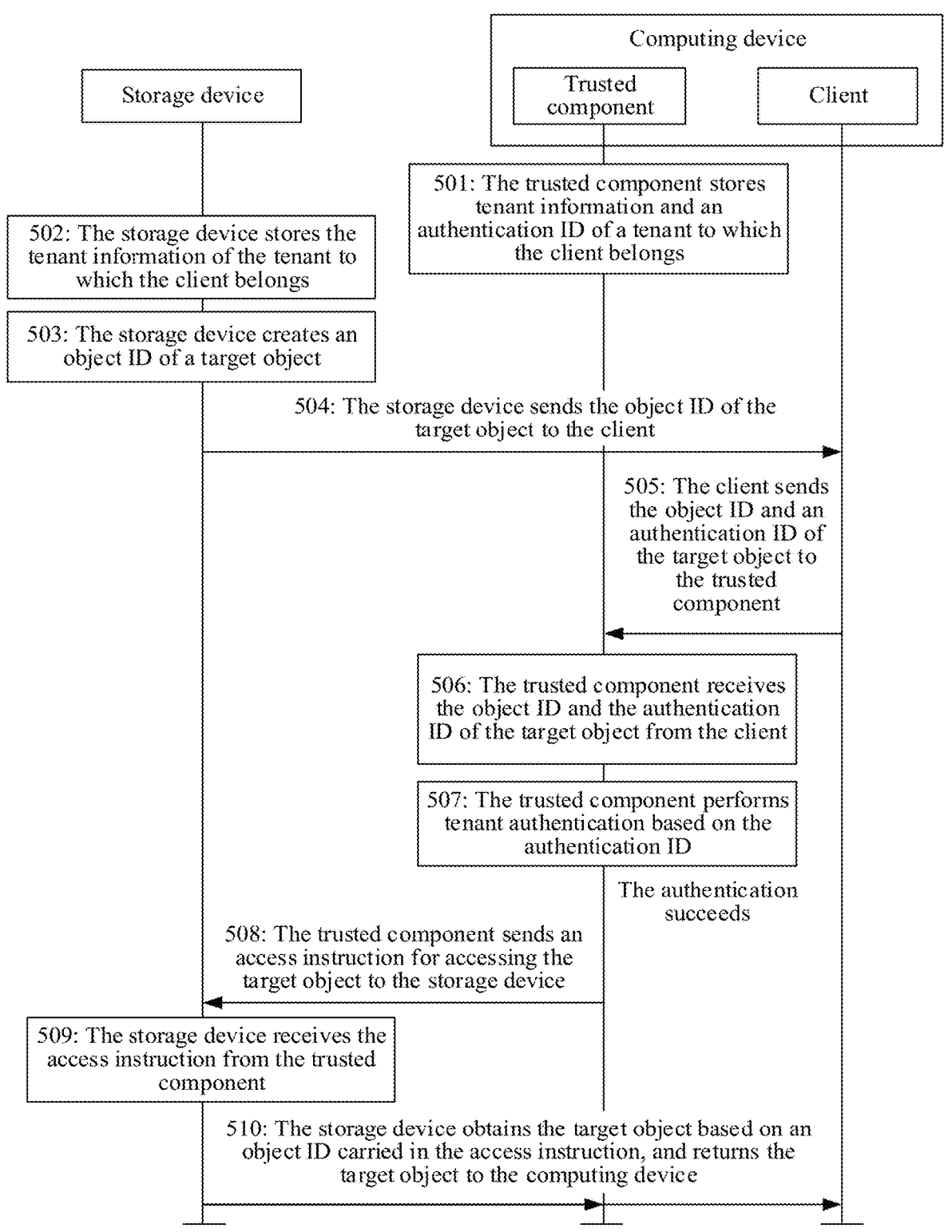
FIG. 5 is a schematic flowchart of an access object authentication method according to an embodiment of this disclosure.

With reference to FIG. 5, the following describes an access object authentication method provided in an embodiment of this disclosure. FIG. 5 is a schematic flowchart of an access object authentication method according to an embodiment of this disclosure. As shown in FIG. 5, the access object authentication method is applied to the object storage system shown in FIG. 2. Interaction between the computing device 100 and the storage device 200 in the system is used as an example to describe the access object authentication method below. For example, the method includes the following step 501 to step 510.

501: A trusted component in the computing device stores tenant information and an authentication ID of a tenant to which a client belongs.

In this embodiment of this disclosure, the trusted component is a DPU, a hypervisor, or a TEE. This is not limited. The client is any client that is run in the computing device. For example, the trusted component receives a first registration instruction from the client, and stores, based on the first registration instruction, the tenant information and the authentication ID of the tenant to which the client belongs, where the first registration instruction carries the tenant information of the tenant to which the client belongs. The authentication ID is provided by hardware in the computing device, and cannot be changed by the client. For example, when transmitting a registration instruction of the client, a PCIe bus of the computing device provides the authentication ID for the trusted component.

In some embodiments, the tenant information of the tenant to which the client belongs includes a tenant ID of the tenant to which the client belongs. For any client in the computing device, a tenant ID of a tenant to which the client belongs is associated with a unique authentication ID, that is, the trusted component can find, based on the authentication ID, a unique tenant ID that matches the authentication ID. In some embodiments, the tenant information of the tenant to which the client belongs further includes a key of the tenant to which the client belongs. For any tenant in the object storage system, the tenant is associated with a unique key, that is, the trusted component can find, based on the tenant ID, a unique key that matches the tenant ID.

In some embodiments, the trusted component is a DPU, and the authentication ID is a VF ID of a VF provided by the DPU for the tenant to which the client belongs. For example, the computing device runs the client based on an SR-IOV technology. An interface of the DPU corresponds to at least one VF ID. When receiving the first registration instruction from the client, the DPU correspondingly stores, based on a VF ID corresponding to the first registration instruction, the VF ID and the tenant information carried in the first registration instruction, that is, uses the VF ID as the authentication ID of the tenant to which the client belongs.

In some embodiments, the trusted component is a DPU, a hypervisor, or a TEE, and the authentication ID is a VM ID of a VM configured to run the client, or the authentication ID is an ID of a container configured to run the client. For example, the computing device runs the client based on a VMware technology. The client is run in the VM, and the authentication ID is the VM ID of the VM. For example, the computing device runs the client based on the container technology. The client is run in the container, and the authentication ID is the container ID of the container. It should be noted that, in this case, a manner in which the trusted component stores the tenant information and the authentication ID of the tenant to which the client belongs is similar to that in the foregoing process. Details are not described herein.

In some embodiments, the trusted component stores the tenant information and the authentication ID of the tenant to which the client belongs in a mapping relationship table of the trusted component, and the client cannot sense or change the tenant information or the authentication ID. This ensures security of the tenant information and the authentication ID. In some embodiments, the mapping relationship table stores tenant information and authentication IDs of tenants to which all clients in the computing device belong. In some other embodiments, the mapping relationship table stores authentication IDs in tenant information of tenants to which all clients in the object storage system belong. This is not limited. It should be understood that, the mapping relationship table stored by the trusted component has a small scale, only a relationship between the tenant information and the authentication ID needs to be stored, and a relationship between the tenant information and an object does not need to be stored, to facilitate a hardware implementation. Correspondingly, time required by the trusted component to subsequently query information by using the mapping relationship table is also short, to effectively improve object access efficiency. In contrast, in a solution in which a service provider performs tenant authentication in another technology, the service provider needs to record tenant information of tenants to which all objects belong, and a large quantity of objects are usually stored in a system. Consequently, the service provider needs to dynamically maintain a huge mapping relationship table. This is not conducive to a hardware implementation and severely affects running efficiency of the service provider.

502: The storage device stores the tenant information of the tenant to which the client belongs.

In this embodiment of this disclosure, the tenant information stored in the storage device includes the tenant ID of the tenant to which the client belongs. In some embodiments, the tenant information of the tenant to which the client belongs further includes a key of the tenant to which the client belongs. For example, the storage device receives a second registration instruction of the client from the computing device, and stores, based on the second registration instruction, the tenant information of the tenant to which the client belongs, where the second registration instruction carries the tenant information of the tenant to which the client belongs.

Through the foregoing step 501 and step 502, on a computing device side, the trusted component in the computing device stores the tenant information and the authentication ID of the tenant to which the client belongs, so that the trusted component implements a tenant authentication process when the client subsequently accesses an object. On a storage device side, the storage device stores the tenant information of the tenant to which the client belongs, so that the storage device can implement a process of creating an object ID subsequently.

It should be noted that an execution sequence of the foregoing step 501 and step 502 and occasions on which the client registers with the computing device and the storage device are not limited in this embodiment of this disclosure. For example, the client may register with the computing device by delivering the first registration instruction, and then register with the storage device by delivering the second registration instruction, or may register with the computing device and the storage device by delivering a target registration instruction.

503: The storage device creates an object ID of a target object.

In this embodiment of this disclosure, the target object belongs to a target tenant, and the target tenant is a tenant that has permission to access the target object. The storage device creates two object IDs for the target object based on a creation instruction sent by the computing device for the target object. The first one is a common ID (referred to as a first ID in the following embodiment) of the target object, and is used inside the storage device, so that the storage device determines a storage address of the object based on the common ID. The second one is a security ID (referred to as a second ID in the following embodiment) of the target object, and is provided for the computing device to use, so that the computing device accesses the target object based on the security ID.

It should be noted that, different from a practice in which the client generates the object ID, in this disclosure, the object ID is generated by the storage device. Further, different from a practice in which the storage device creates an object ID for the client to use, in this disclosure, the storage device creates two object IDs (the common ID and the security ID) for the target object, and provides the security ID in the two object IDs for the client to use, to improve security of the object ID. The common ID is used to locally retrieve the object in the storage device. The following describes a specific process in which the storage device creates the object ID of the target object in this step. For example, step 503 includes the following step 5031 and step 5032.

5031: The storage device receives the creation instruction for the target object from the computing device, and creates the first ID of the target object.

The creation instruction carries the target object and a tenant ID of the target tenant. The first ID of the target object uniquely identifies the target object, and is also referred to as an original object ID of the target object. The storage device can determine a storage address of the target object based on the first ID. The tenant ID of the target tenant uniquely identifies the target tenant. For example, the tenant ID of the target tenant is 000001. In some embodiments, the storage device creates the first ID of the target object based on information such as a data type and data content of the target object. This is not limited in this embodiment of this disclosure.

5032: The storage device creates the second ID of the target object based on the first ID.

The second ID of the target object is subsequently provided for the computing device for use, so that the computing device accesses the target object based on the second ID. For example, a process in which the storage device creates the second ID of the target object includes any one of the following:

First manner: The first ID and the tenant ID of the target tenant are encrypted based on a key of the target tenant, to obtain the second ID of the target object.

The second ID created by the storage device includes an encrypted first ID and an encrypted tenant ID. For example, based on the foregoing step 502, it can be learned that the storage device stores the key corresponding to the target tenant. The storage device queries for the key corresponding to the tenant ID of the target tenant, and invokes a first target algorithm based on the key, to encrypt the first ID and the tenant ID to obtain the second ID. For example, the first target algorithm is a symmetric encryption algorithm. For example, the first target algorithm is a counter (CTR) mode, an electronic codebook (ECB) mode, an output feedback (OFB) mode, a cipher block chaining (CBC) mode, or a cipher feedback (CFB) mode. This is not limited. A developer can select a corresponding encryption algorithm according to an actual requirement, to create the second ID.

The following describes several optional manners in which the storage device creates the second ID in this manner.

(1) The tenant ID of the target tenant is filled in a preset field of the first ID, to obtain the filled first ID, and the filled first ID is encrypted based on the key of the target tenant, to obtain the second ID.

Figures 6, 7:
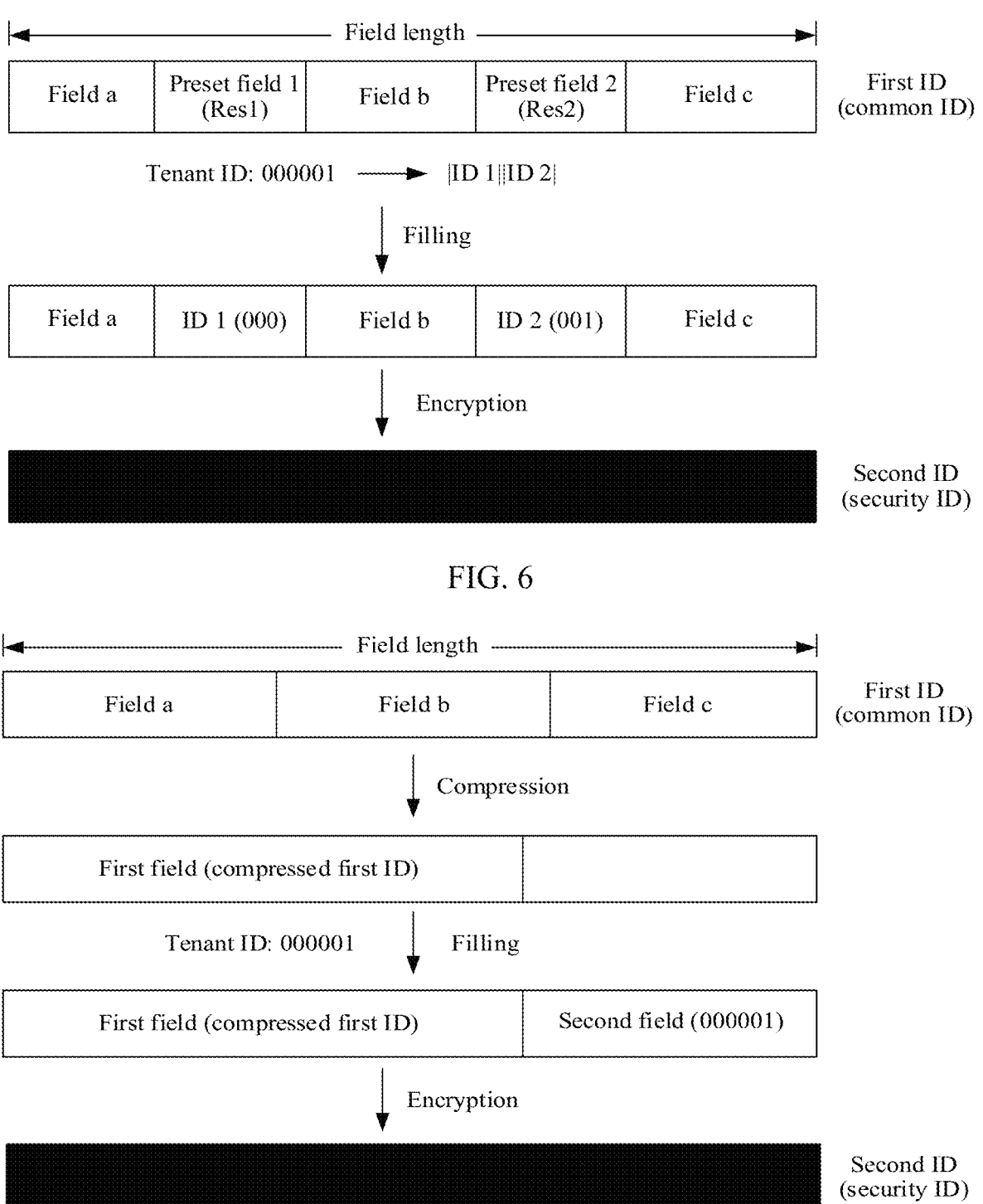
FIG. 6 is a diagram of creating a second ID according to an embodiment of this disclosure.
FIG. 7 is another diagram of creating a second ID according to an embodiment of this disclosure.

The preset field of the first ID is a reserved field of the first ID, and a length of the first ID is the same as a length of the second ID. In some embodiments, when the first ID includes a plurality of preset fields, the storage device segments the tenant ID and fills the tenant ID in the plurality of preset fields of the first ID, to obtain the filled first ID. For example, FIG. 6 is a diagram of creating a second ID according to an embodiment of this disclosure. As shown in FIG. 6, the first ID of the target object includes preset fields res1 and res2, and the tenant ID is 000001. The storage device segments the tenant ID to obtain an ID 1 (000) and an ID 2 (001), fills the ID 1 in the preset field res1, fills the ID 2 in the preset field res2, to obtain the filled first ID, and encrypts the filled first ID based on the key of the target tenant, to obtain the second ID.

In this segment based filling manner, the tenant ID of the target tenant is filled in different fields of the first ID, and then the filled first ID is encrypted, to improve security of the second ID.

(2) A compressed first ID is filled in a first field, the tenant ID of the target tenant is filled in a second field, and the first field and the second field are encrypted based on the key of the target tenant, to obtain the second ID.

A length of the first ID is the same as a length of the second ID. For example, FIG. 7 is another diagram of creating a second ID according to an embodiment of this disclosure. As shown in FIG. 7, the storage device compresses the first ID and fills a compressed first ID in the first field (for example, compresses the first ID of a length of 24 bytes to 16 bytes, where this is not limited), fills the tenant ID of the target tenant in the second field, and encrypts the first field and the second field based on the key of the target tenant, to obtain the second ID.

In this manner in which compression is performed and then encryption is performed, after the first ID is compressed, the compressed first ID and the tenant ID are encrypted, to improve security of the first ID. In addition, when the computing device subsequently performs tenant authentication based on the second ID, authentication can be implemented by extracting the second field. This simplifies an authentication process of the computing device.

(3) The tenant ID of the target tenant is filled in a third field, and the first ID and the third field are encrypted based on the key of the target tenant, to obtain the second ID.

Figure 8:
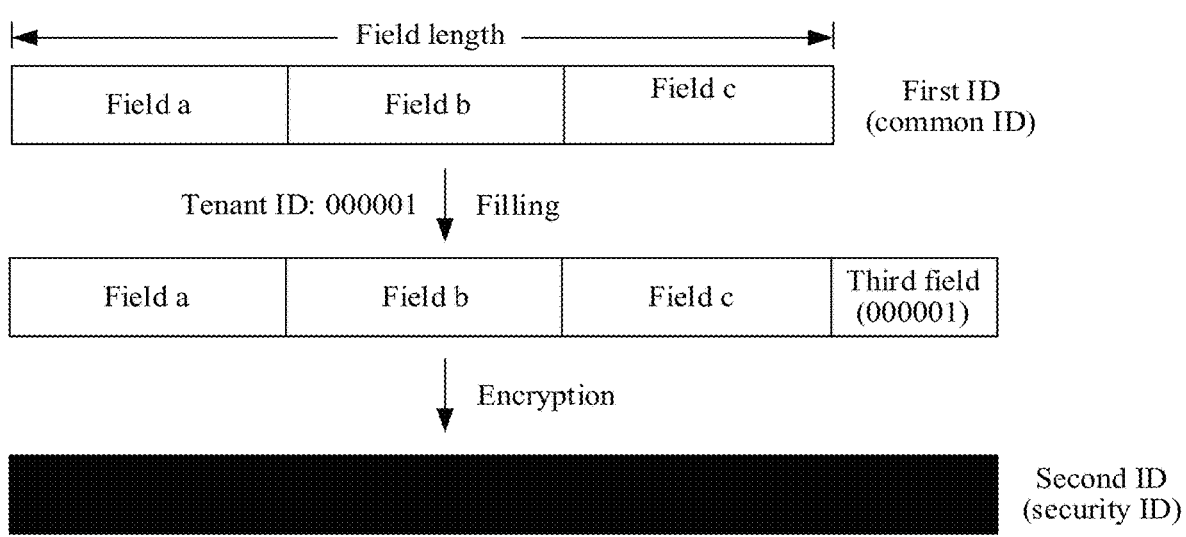
FIG. 8 is another diagram of creating a second ID according to an embodiment of this disclosure.

The third field is an additional field added based on the first ID. For example, the third field is added to any location such as a tail, a middle part, or a header of the first ID. This is not limited in this embodiment of this disclosure. For example, FIG. 8 is another diagram of creating a second ID according to an embodiment of this disclosure. As shown in FIG. 8, the storage device fills the tenant ID in the third field, adds the third field to the tail of the first ID, and encrypts the first ID and the third field based on the key of the target tenant, to obtain the second ID.

In this manner in which an additional field is directly added to the first ID, a speed of creating the second ID by the storage device is increased.

It should be noted that the length of the second ID created based on either of the foregoing manners (1) and (2) is the same as the length of the first ID. In this manner, an API interface of the client in the computing device does not need to be changed, and applicability of the access object authentication method is extended.

In addition, in some embodiments, when an initialization vector is used for encryption in the foregoing encryption process, the initialization vector is generated in any one of the following manners:

(1) The initialization vector corresponds to the target tenant, and the initialization vector is the same for any object that the target tenant has permission to access. That is, one tenant corresponds to one initialization vector, and the storage device uses a same initialization vector when creating second IDs for all objects of a same tenant. In this manner, computing resources can be saved while security of the second ID is ensured.

(2) The initialization vector corresponds to the target object, and the initialization vector is different for any object created by the storage device. That is, one object corresponds to one initialization vector, and the storage device generates a corresponding initialization vector based on a first ID of each object. In this manner, security of the second ID can be further improved.

In the foregoing first manner of creating the second ID, the storage device directly combines the tenant ID of the target tenant and the first ID, and then encrypts the tenant ID and the first ID, to improve efficiency of creating the second ID while ensuring security of the second ID. In addition, when the length of the first ID is the same as the length of the second ID, the API interface of the client in the computing device does not need to be changed, and applicability of the access object authentication method is extended.

Second manner: The first ID is encrypted based on the key of the target tenant, to obtain an encrypted first ID, a first MAC is generated, and the second ID of the target object is obtained based on the first MAC and the encrypted first ID.

The second ID created by the storage device includes the first MAC and the encrypted first ID. For example, based on the foregoing step 502, it can be learned that the storage device stores the key corresponding to the target tenant. The storage device queries for the key corresponding to the tenant ID of the target tenant, invokes a second target algorithm based on the key, to encrypt the first ID to obtain an encrypted first ID, generates the first MAC, and obtains the second ID based on the first MAC and the encrypted first ID. For example, the second target algorithm is an AEAD algorithm. For example, the second target algorithm is an AEAD algorithm such as an advanced encryption standard (AES)-Galois counter mode (GCM) or an AES-counter with CBC-MAC mode (CCM). This is not limited in this embodiment of this disclosure. In some embodiments, the second target algorithm is an encrypt-then-MAC (EtM) based AEAD algorithm, an encrypt-and-MAC (E&M) based AEAD algorithm, a MAC-then-encrypt (MtE) based AEAD algorithm, or the like. This is not limited.

The following describes several optional manners in which the storage device creates the second ID in this manner.

(1) The first ID is encrypted based on the key of the target tenant, to obtain the encrypted first ID, the first MAC is generated based on the key of the target tenant and the first ID, and the second ID is obtained based on the first MAC and the encrypted first ID.

The first MAC is related to the key of the target tenant and the first ID. In some embodiments, the storage device directly combines the first MAC and the encrypted first ID (for example, adds the first MAC to a tail of the encrypted first ID, where this is not limited), to obtain the second ID. In some other embodiments, after separately compressing the first MAC and the encrypted first ID, the storage device combines a compressed first MAC and a compressed encrypted first ID to obtain the second ID, so that a length of the second ID is the same as a length of the first ID, and applicability of the access object authentication method is extended.

In this manner, the first MAC is generated based on the first ID, so that the created second ID has confidentiality, integrity, and authentication, and security of the second ID is effectively improved.

(2) The first ID is encrypted based on the key of the target tenant, to obtain the encrypted first ID, the first MAC is generated based on the key of the target tenant, the first ID, and the tenant ID of the target tenant, and the second ID is obtained based on the first MAC and the encrypted first ID.

The first MAC is related to the key of the target tenant, the first ID, and the tenant ID of the target tenant. Based on a process similar to (1), the storage device may directly combine the first MAC and the encrypted first ID to obtain the second ID, or may combine the compressed first MAC and the compressed encrypted first ID to obtain the second ID. This is not limited.

Figure 9:
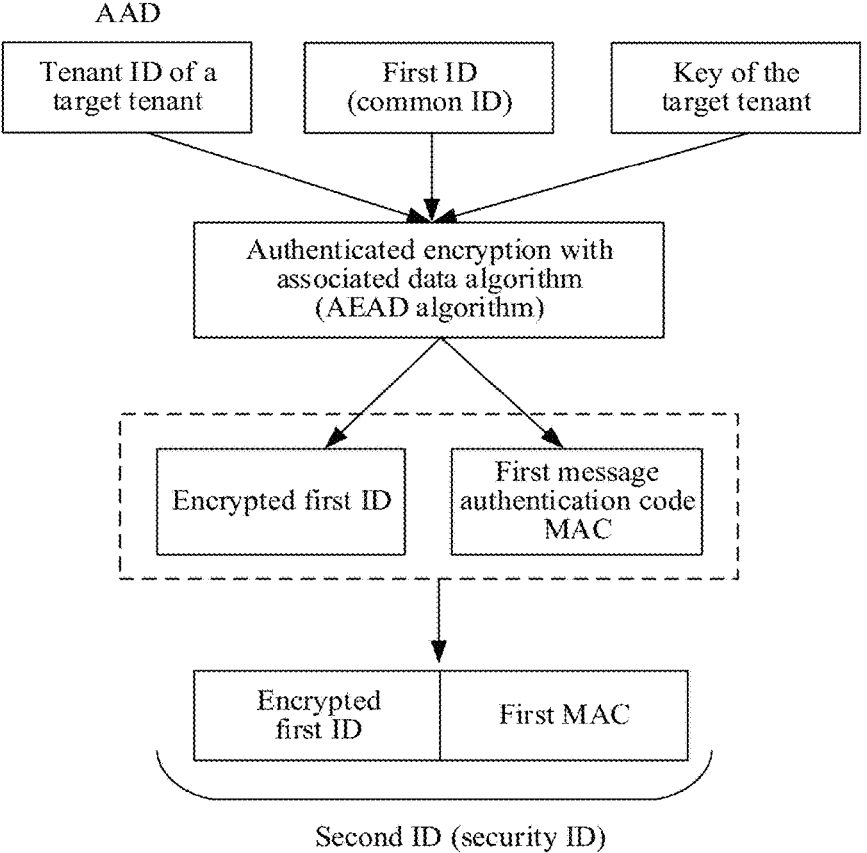
FIG. 9 is another diagram of creating a second ID according to an embodiment of this disclosure.

It should be noted that in this process, the tenant ID of the target tenant is used as additional authentication data (AAD) in an operation process of the second target algorithm, to generate the first MAC. For example, FIG. 9 is another diagram of creating a second ID according to an embodiment of this disclosure. As shown in FIG. 9, the storage device uses the tenant ID of the target tenant as AAD, invokes an AEAD encryption algorithm such as the AES-GCM or the AES-CCM to generate the first MAC and the encrypted first ID with reference to the first ID and the key of the target tenant, and combines the first MAC and the encrypted first ID to obtain the second ID.

In this manner, the tenant ID of the target tenant is used as the AAD to generate the first MAC, so that confidentiality, integrity, and authentication of the created second ID are improved, to further improve security of the second ID.

In the foregoing second manner of creating the second ID, the storage device generates the first MAC based on the key of the target tenant when encrypting the first ID, so that the created second ID has confidentiality, integrity, and authentication, to effectively improve security of the second ID.

Third manner: A third MAC is generated based on the key of the target tenant, and the first ID and the third MAC are combined to obtain the second ID of the target object.

The second ID of the target object includes the third MAC and an unencrypted first ID. For example, the storage device invokes a third target algorithm based on the key of the target tenant, to generate the third MAC, and combines the first ID and the third MAC to obtain the second ID. For example, the third target algorithm is a MAC algorithm. For example, the third target algorithm is a hash MAC (HMAC) algorithm or a cipher-based MAC (CMAC) algorithm. This is not limited.

The following describes several manners in which the storage device creates the second ID in this manner.

(1) The third MAC is generated based on the key of the target tenant and the first ID, and the first ID and the third MAC are combined to obtain the second ID.

The third MAC is related to the key of the target tenant and the first ID.

(2) The third MAC is generated based on the key of the target tenant, the first ID, and the tenant ID of the target tenant, and the first ID and the third MAC are combined to obtain the second ID.

The third MAC is related to the key of the target tenant, the first ID, and the tenant ID of the target tenant.

It should be noted that, based on a process similar to that in the foregoing second manner of creating the second ID, in the third manner of creating the second ID, the storage device may directly combine the third MAC and the first ID to obtain the second ID, or may combine a compressed third MAC and a compressed first ID to obtain the second ID. This is not limited.

Figure 10:
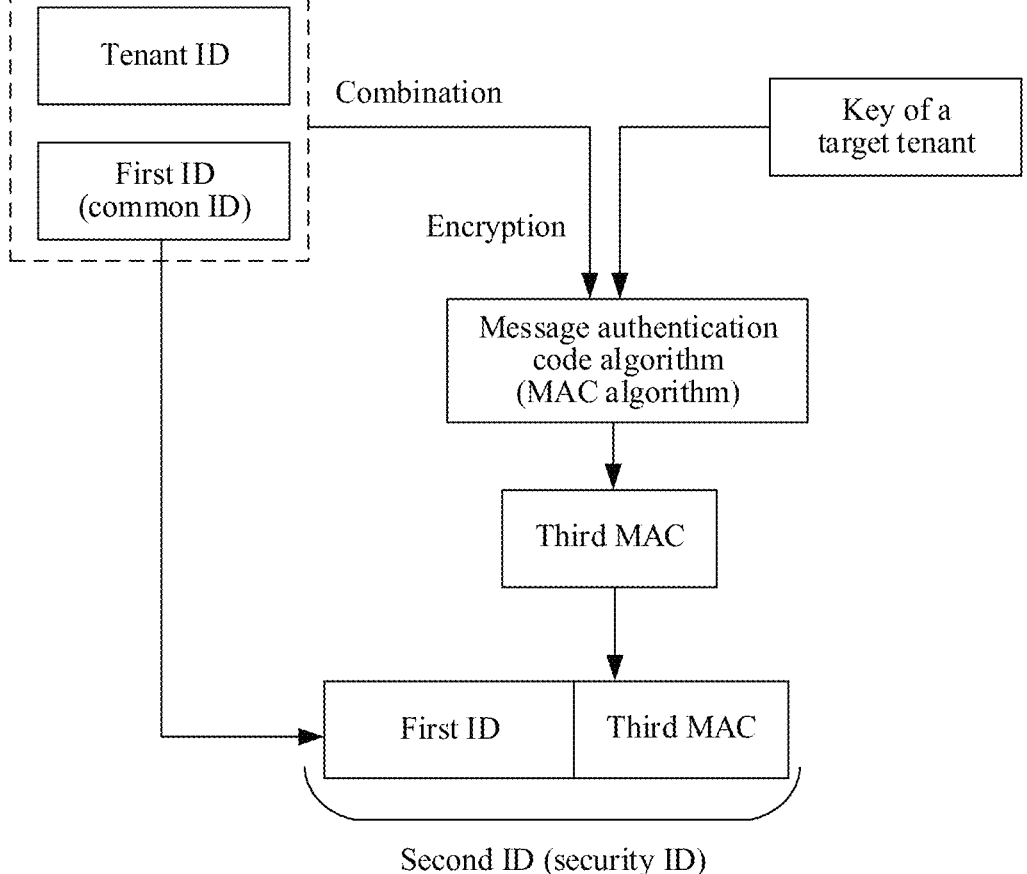
FIG. 10 is another diagram of creating a second ID according to an embodiment of this disclosure.

For example, FIG. 10 is another diagram of creating a second ID according to an embodiment of this disclosure. As shown in FIG. 10, the storage device invokes an algorithm such as the HMAC or the CMAC based on the key of the target tenant, the first ID, and the tenant ID of the target tenant, to generate the third MAC, and adds the third MAC to a tail of the first ID to obtain the second ID.

Figure 11:
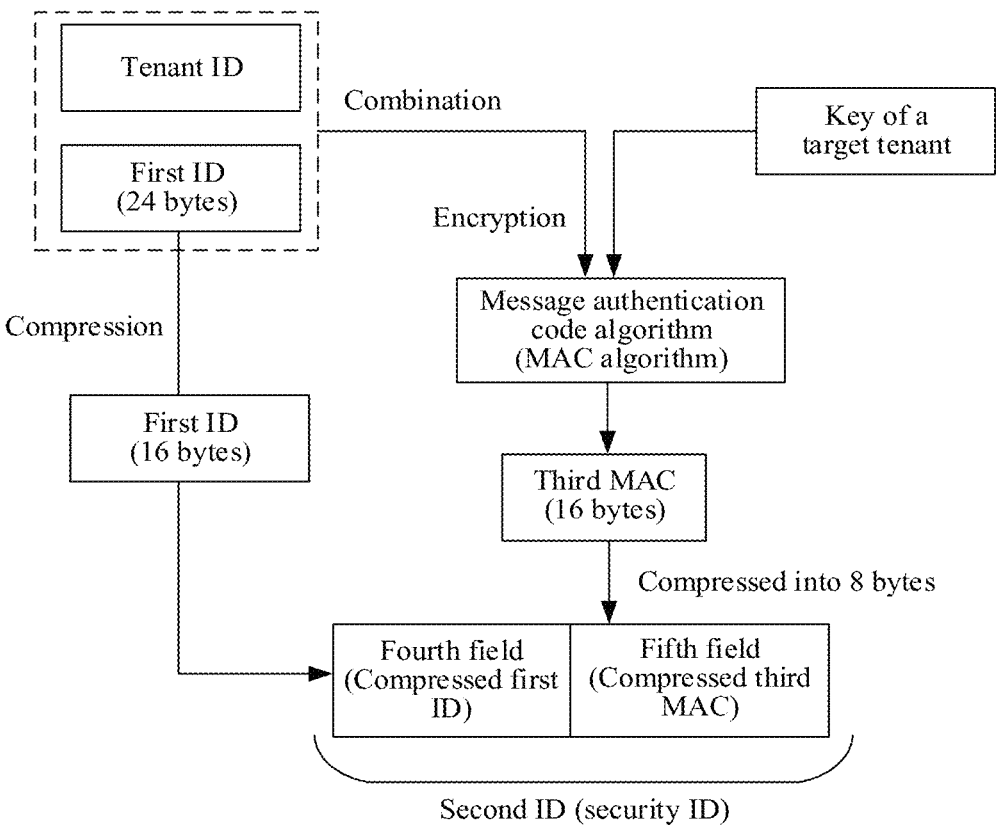
FIG. 11 is another diagram of creating a second ID according to an embodiment of this disclosure.

For example, FIG. 11 is another diagram of creating a second ID according to an embodiment of this disclosure. As shown in FIG. 11, for example, a length of the first ID is 24 bytes. The storage device fills the compressed first ID in a fourth field (for example, compresses the first ID of a length of 24 bytes to 16 bytes), fills the compressed third MAC in a fifth field (for example, compresses the third MAC of a length of 16 bytes to 8 bytes), and combines the fourth field and the fifth field to obtain the second ID. It should be noted that, a developer can compress the first ID and/or the third MAC according to an actual requirement, provided that a length of the second ID obtained through compression and then combination is the same as the length of the first ID. In addition, a compression manner used in the foregoing process is not limited in this embodiment of this disclosure. In this compression manner, security of the second ID is further improved.

In the foregoing third manner of creating the second ID, the first ID does not need to be encrypted, and computing resources of the computing device are saved on the basis of ensuring security of the second ID. When the computing device subsequently accesses the target object based on the second ID, the trusted component may implement authentication by extracting a field in which the third MAC is located, to simplify an authentication process of the computing device. In addition, when the length of the second ID is the same as the length of the first ID, an API interface of the client in the computing device does not need to be changed, and applicability of the access object authentication method is extended.

Through the foregoing step 5032, the storage device performs a cryptographic operation on the first ID of the target object, to create the second ID of the target object, so as to provide a basis for the trusted component to implement tenant authentication when the computing device subsequently accesses the target object based on the second ID. This ensures multi-tenant data isolation and security.

It should be understood that the foregoing optional manners of creating the second ID are merely examples, and do not constitute a limitation on this disclosure. Any other manner in which a cryptographic operation is performed on the first ID of the target object to create the second ID may be applied to this embodiment of this disclosure. For example, the storage device invokes a fourth target algorithm to combine the tenant ID of the target tenant and the first ID to obtain the second ID. For example, the fourth target algorithm is to insert the tenant ID into a preset location of the first ID according to a preset rule, to obtain the second ID. In other words, in this case, the second ID includes the unencrypted first ID and an unencrypted tenant ID. This is not limited in this embodiment of this disclosure.

It should be noted that, through step 503, the storage device creates two object IDs for the target object, where the second ID of the target object is provided for the computing device to use. Therefore, the storage device performs the following step 504, to send the second ID of the target object to the computing device.

504: The storage device sends the object ID of the target object to the client in the computing device.

In this embodiment of this disclosure, it can be learned from the foregoing step 503 that the second ID created by the storage device may further include other information in addition to the first ID of the target object. Correspondingly, in this step, a process in which the storage device sends the object ID of the target object to the computing device includes the following several cases:

First case: The second ID of the target object includes the encrypted first ID and the encrypted tenant ID. That is, the storage device sends the encrypted first ID and the encrypted tenant ID to the client.

Second case: The second ID of the target object includes the first MAC and the encrypted first ID. That is, the storage device sends the first MAC and the encrypted first ID to the client, where the first MAC is related to the key of the target tenant that is recorded by the storage device and the first ID of the target object that is recorded by the storage device.

Third case: The second ID of the target object includes the third MAC and the unencrypted first ID. That is, the storage device sends the third MAC and the unencrypted first ID to the client, where the third MAC is related to the key of the target tenant that is recorded by the storage device and the first ID of the target object that is recorded by the storage device.

It should be noted that, the following can be learned with reference to the foregoing step 503 and step 504:

In some embodiments, if the second ID of the target object includes the encrypted first ID, the foregoing step 503 and step 504 may be understood as "the storage device creates the object ID of the target object, encrypts the object ID of the target object to generate an encrypted object ID, and sends the encrypted object ID to the client". Certainly, when the second ID of the target object further includes the encrypted tenant ID, step 503 and step 504 further include "the storage device encrypts the tenant ID of the target tenant, and sends the encrypted tenant ID to the client". When the second ID of the target object further includes the first MAC, the foregoing step 503 and step 504 further include "the storage device generates the first MAC, and sends the first MAC to the client".

In some embodiments, if the second ID of the target object includes the unencrypted first ID, the foregoing step 503 and step 504 may be understood as "the storage device creates the object ID of the target object, and sends the object ID of the target object to the client". Certainly, when the second ID of the target object further includes the third MAC, the foregoing step 503 and step 504 further include "the storage device generates the third MAC, and sends the third MAC to the client". When the second ID of the target object further includes the unencrypted tenant ID, the foregoing step 503 and step 504 further include "the storage device sends the unencrypted tenant ID to the client".

Through the foregoing step 503 and step 504, the storage device creates two object IDs for the target object, and sends the security ID of the target object to the client, so that the client subsequently accesses the target object. Further, because the security ID is obtained by processing the common ID of the target object through a cryptographic operation, when the client accesses the target object based on the security ID, the trusted component in the computing device can process the security ID through the cryptographic operation, to implement tenant authentication. This ensures multi-tenant data isolation and security.

The following describes, by using an example in which the client accesses the target object, a process in which the trusted component implements tenant authentication through step 505 to step 510.

505: The client in the computing device sends the object ID and the authentication ID of the target object to the trusted component in the computing device.

In this embodiment of this disclosure, the client sends the object ID and the authentication ID of the target object to the trusted component, to request to access the target object. The object ID of the target object may be the encrypted object ID, or may be the unencrypted object ID. This is not limited. When the object ID of the target object is the unencrypted object ID, the unencrypted object ID may also be understood as the original object ID of the target object. For details, refer to the foregoing step 503 and step 504. Details are not described herein again.

It should be noted that, in some embodiments, the client sends the object ID and the authentication ID to the trusted component by using a same instruction. In some other embodiments, the client sends the object ID and the authentication ID to the trusted component by using different instructions. This is not limited.

It should be understood that, based on the foregoing descriptions, it can be learned that the authentication ID cannot be changed by the client. This means that a user cannot change or forge the authentication ID. Therefore, security is high. For example, an implementation method for sending the authentication ID by the client is as follows. When the authentication ID is added, an instruction for accessing the target object by the client is out of control of the client. Therefore, the authentication ID cannot be changed by the client. For example, the client is run in the VM (or the container), and an access instruction generated by the client does not have an authentication ID. When the access instruction leaves the client but does not arrive at the trusted component, the VM (or the container) adds the authentication ID to the access instruction.

506: The trusted component in the computing device receives the object ID and the authentication ID of the target object from the client in the computing device.

In this embodiment of this disclosure, based on the foregoing step 501, it can be learned that the authentication ID includes a plurality of cases. For example, the authentication ID is the VF ID of the VF provided by the DPU for the tenant to which the client belongs, or the authentication ID is the VM ID of the VM and is added by the VM that runs the client, or the authentication ID is the container ID and is added by the container that runs the client. Details are not described herein again.

507: The trusted component in the computing device performs tenant authentication based on the authentication ID.

In this embodiment of this disclosure, the trusted component performs tenant authentication based on the authentication ID. When authentication on the tenant to which the client belongs succeeds, it is determined that the tenant to which the client belongs has permission to access the target object, and the trusted component performs the following step 508 to access the target object. When authentication on the tenant to which the client belongs fails, it is determined that the tenant to which the client belongs does not have permission to access the target object, and the trusted component ends the current procedure.

For example, based on the process in which the storage device creates the second ID in the foregoing step 503 and step 504, it can be learned that the second ID provided by the storage device for the computing device may have a plurality of forms. Therefore, the following describes, based on second IDs in different forms, a process in which the trusted component performs tenant authentication based on the authentication ID. The process includes any one of the following cases:

First Case: The Second ID of the Target Object Includes the Encrypted First ID and the Encrypted Tenant ID.

The object ID received by the trusted component from the client is the encrypted first ID, and the trusted component further receives the encrypted tenant ID from the client. For example, the trusted component queries for a tenant ID and a key that correspond to the authentication ID, and decrypts the encrypted first ID based on the key, to obtain a decrypted first ID and a decrypted tenant ID. When the found tenant ID matches the tenant ID received by the trusted component from the client, the authentication succeeds, indicating that the tenant to which the client belongs has permission to access the target object.

Figure 12:
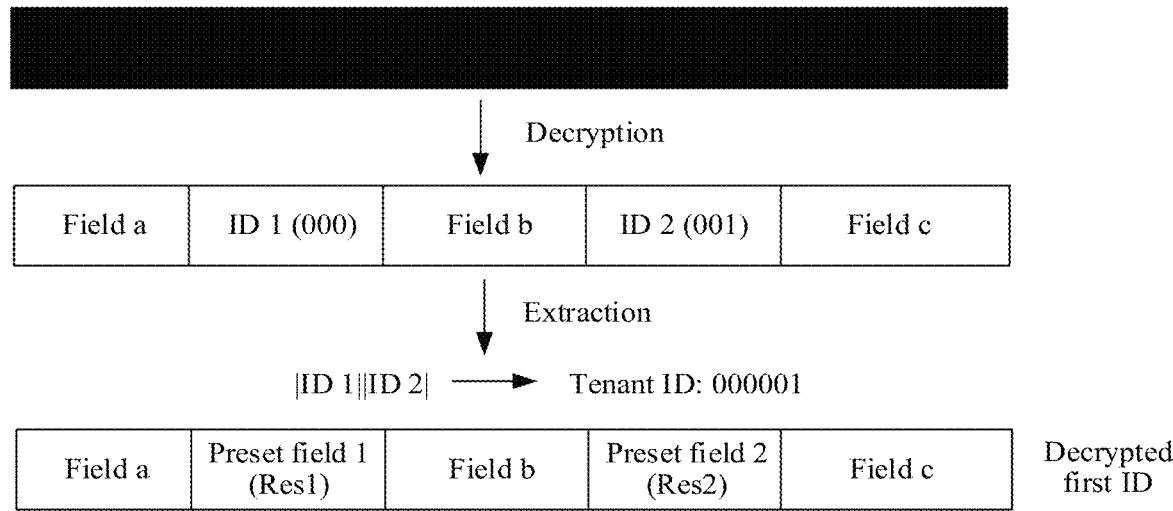
FIG. 12 is a diagram of performing tenant authentication based on an authentication ID according to an embodiment of this disclosure.

For example, FIG. 12 is a diagram of performing tenant authentication based on an authentication ID according to an embodiment of this disclosure. As shown in FIG. 12, an example in which the storage device creates the second ID by filling in the preset field is used. The trusted component queries for the tenant ID and the key that correspond to the authentication ID, decrypts the encrypted first ID and the encrypted tenant ID based on the found key, extracts an ID 1 (000) and an ID 2 (001) from preset fields res1 and res2, and combines the extracted ID 1 (000) and ID 2 (001) to obtain a decrypted tenant ID 000001. If the found tenant ID matches the decrypted tenant ID, the authentication succeeds.

In the foregoing manner, when the trusted component further receives the tenant ID from the client, because the authentication ID cannot be changed by the client, the trusted component can query for a real tenant ID of the client based on the authentication ID, and compare the found real tenant ID with the tenant ID received from the client, to implement tenant authentication. This ensures multi-tenant data isolation and security.

Second Case: The Second ID of the Target Object Includes the First MAC and the Encrypted First ID.

The object ID received by the trusted component from the client is the encrypted first ID, and the trusted component further receives the first MAC from the client. For example, the trusted component queries for a key corresponding to the authentication ID, generates a second MAC, where the second MAC is related to the found key and the object ID received from the client, and when the first MAC matches the second MAC, determines that the authentication succeeds. In some embodiments, this process further includes the following. The trusted component decrypts the encrypted first ID based on the key, to obtain the decrypted first ID, so as to subsequently send the access instruction for accessing the target object to the storage device.

In some embodiments, the first MAC and the encrypted first ID that are received by the trusted component from the client may be compressed. Based on this, the trusted component extracts a field in which the object ID is located, and decompresses and restores the extracted field to obtain the encrypted first ID. The trusted component extracts a field in which the first MAC is located, compresses the generated second MAC, and when the extracted field in which the first MAC is located matches the compressed second MAC, the authentication succeeds.

Figure 13:
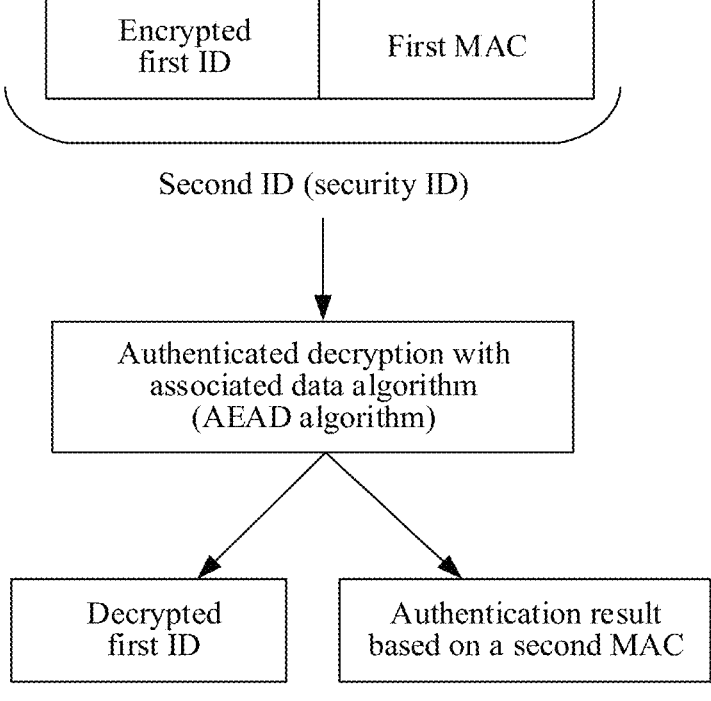
FIG. 13 is a diagram of performing tenant authentication based on an authentication ID according to an embodiment of this disclosure.

For example, FIG. 13 is a diagram of performing tenant authentication based on an authentication ID according to an embodiment of this disclosure. As shown in FIG. 13, an example in which the first MAC is related to the key of the target tenant, the first ID, and the tenant ID of the target tenant is used. The trusted component queries for the tenant ID and the key that correspond to the authentication ID, decrypts the encrypted first ID based on the key and by using an AEAD decryption algorithm such as the AES-GCM or the AES-CCM, to obtain the decrypted first ID, generates the second MAC based on the key, the decrypted first ID, and the found tenant ID, and when the first MAC matches the second MAC, determine that the authentication succeeds.

In the foregoing manner, when the trusted component further receives the first MAC from the client, because the authentication ID cannot be changed by the client, the trusted component can query, based on the authentication ID, for a real key of the tenant to which the client belongs, generate the second MAC based on the found real key, and compare the second MAC with the first MAC received from the client, to implement an authentication process. This ensures multi-tenant data isolation and security.

Third Case: The Second ID of the Target Object Includes the Third MAC and the Unencrypted First ID.

The object ID received by the trusted component from the client is the unencrypted first ID, and the trusted component further receives the third MAC from the client. For example, the trusted component queries for a key corresponding to the authentication ID, generates a fourth MAC, where the fourth MAC is related to the found key and the object ID received from the client, and when the third MAC matches the fourth MAC, the authentication succeeds.

In some embodiments, the object ID and the third MAC that are received by the trusted component from the client may be compressed, and the trusted component performs tenant authentication based on a process similar to that in the foregoing second manner. Details are not described herein again.

It should be noted that the foregoing several processes in which the trusted component performs tenant authentication are merely examples. Because the storage device may create the second ID in a plurality of manners, correspondingly, the trusted component may perform tenant authentication based on the authentication ID in a plurality of manners. This is not limited in this embodiment of this disclosure. For example, when the storage device invokes the fourth target algorithm to combine the tenant ID of the target tenant and the first ID to obtain the second ID, neither the first ID of the target object nor the tenant ID in the second ID is encrypted. When performing tenant authentication, the trusted component queries for a tenant ID corresponding to the authentication ID, and when the found tenant ID matches the tenant ID received from the client, the authentication succeeds. This is not limited in this embodiment of this disclosure.

It should be understood that, in the foregoing step 507, in the process in which the trusted component performs tenant authentication based on the authentication ID, when the object ID received by the trusted component from the client is the encrypted first ID, the trusted component decrypts the encrypted first ID to obtain the decrypted first ID, so as to perform the following step 508 to access the target object, where a decryption algorithm is configured in the trusted component and corresponds to an encryption algorithm involved in creating the second ID in the storage device. When the object ID received by the trusted component from the client is the unencrypted first ID, the trusted component directly performs the following step 508 based on the unencrypted first ID, to access the target object.

In addition, in some embodiments, when the authentication on the trusted component succeeds, the trusted component can further check integrity of the received object ID based on a target rule. If the check succeeds, the following step 508 is performed, or if the check fails, the current procedure ends. For example, if the target rule indicates that a length a field a in the object ID is equal to a sum of a length a field b and a length of a field c, the trusted component checks a relationship between the field a, the field b, and the field c in the object ID based on the target rule. A specific form of the target rule is not limited in this embodiment of this disclosure. In this manner, multi-tenant data isolation and security can be further ensured.

508: The trusted component in the computing device sends the access instruction for accessing the target object to the storage device, where the access instruction carries the object ID of the target object.

In this embodiment of this disclosure, the access instruction is used to access the target object. The object ID of the target object that is carried in the access instruction is the unencrypted first ID (that is, the original object ID or the common ID of the target object).

It should be noted that, with reference to the foregoing step 506 to step 508, the following can be learned:

In some embodiments, if the object ID received by the trusted component from the client is the encrypted first ID, the foregoing step 506 to step 508 may be understood as "the trusted component performs tenant authentication based on the authentication ID, decrypts the encrypted object ID received from the client, to obtain a decrypted object ID used to generate the access instruction, and when the authentication on the tenant to which the client belongs succeeds, sends the access instruction for accessing the target object to the storage device".

In some embodiments, when the trusted component further receives the tenant ID from the client, the process in which the trusted component performs tenant authentication in the foregoing step 506 to step 508 further includes "the trusted component queries for the tenant ID corresponding to the authentication ID, and when the found tenant ID matches the tenant ID received by the trusted component from the client, the authentication succeeds".

In some embodiments, when the trusted component further receives the first MAC from the client, the process in which the trusted component performs tenant authentication in the foregoing step 506 to step 508 further includes "the trusted component queries for the key corresponding to the authentication ID, generates the second MAC, where the second MAC is related to the found key and the object ID received from the client, and when the first MAC matches the second MAC, the authentication succeeds".

Through the foregoing step 506 to step 508, the trusted component receives the object ID and the authentication ID of the target object from the client, performs tenant authentication based on the authentication ID, and when the authentication on the tenant to which the client belongs succeeds, sends the access instruction for accessing the target object to the storage device (where this process may also be understood as that the trusted component restores the security ID of the target object to the common ID). Based on this, when the authentication on the tenant to which the client belongs succeeds, the trusted component can directly access the storage device based on the object ID of the target object, so that an access object authentication process is implemented.

Figure 14:
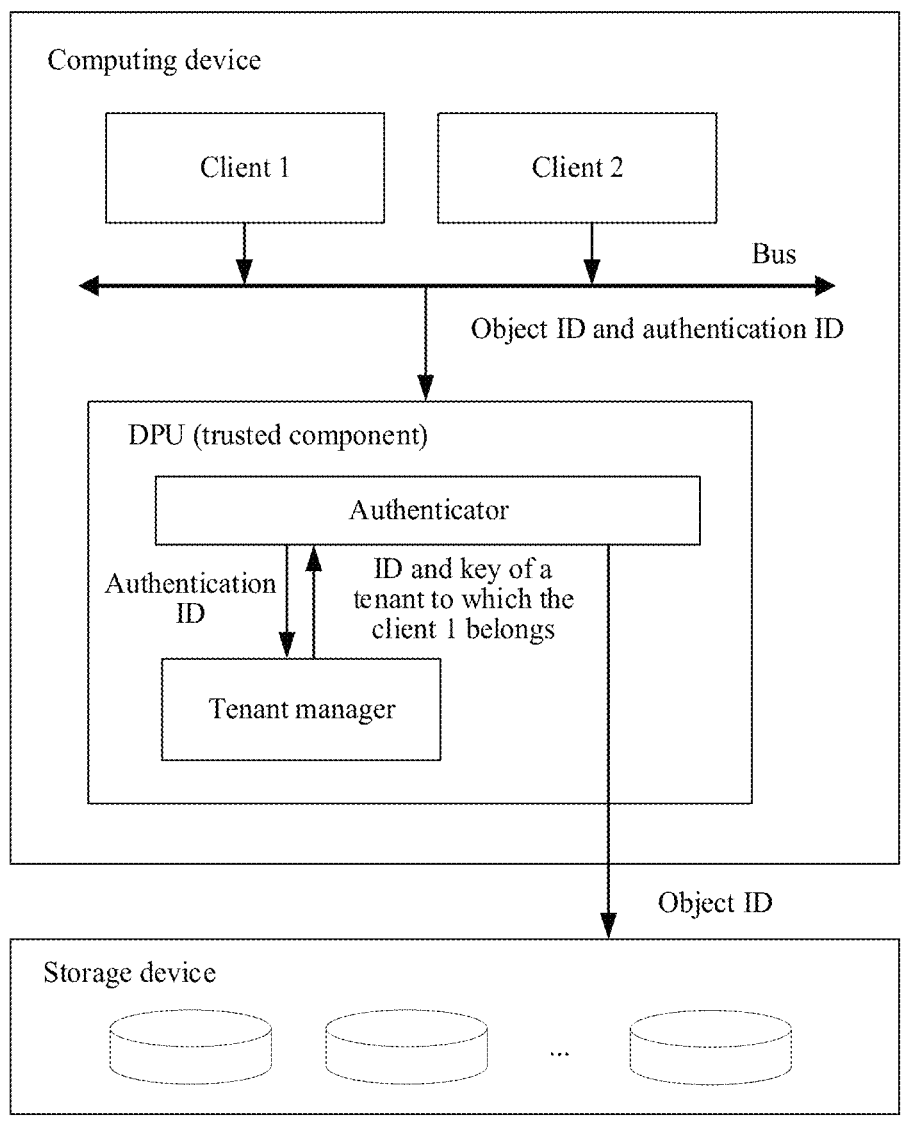
FIG. 14 is a diagram of an access object authentication process according to an embodiment of this disclosure.

For example, as shown in FIG. 14, the following describes, by using an example, the access object authentication process described in the foregoing step 506 to step 508. FIG. 14 is a diagram of an access object authentication process according to an embodiment of this disclosure. As shown in FIG. 14, for example, the trusted component is the DPU. The computing device includes a plurality of clients. When a client 1 requests to access the target object, a hardware virtualization subsystem delivers an authentication ID (a VF ID) of the client 1, the object ID (for example, the encrypted first ID) of the target object, and a tenant ID (for example, an encrypted tenant ID) to the DPU based on the SR-IOV technology. Based on the authentication ID, the DPU queries, by using an authenticator, a mapping relationship table of a tenant manager for a tenant ID and a key that correspond to the authentication ID. The authenticator may be understood as a component that is in the DPU and that is configured to perform the access object authentication method and may be implemented by using at least one segment of program code. The DPU decrypts the received object ID based on the found key, to obtain a decrypted object ID (a common ID) and a decrypted tenant ID. When the decrypted tenant ID matches the found tenant ID, authentication succeeds, and the DPU sends an access instruction to the storage device based on the decrypted object ID, to access the target object. In this manner of using the authentication ID, the storage device does not need to store a correspondence between the tenant ID and the object ID. Therefore, storage space required for authentication is greatly reduced, an amount of queried data is greatly reduced, and query efficiency is improved. In addition, a query process is performed by the computing device (instead of the storage device). This further saves storage space of the storage device and reduces occupation of running resources of the storage device.

509: The storage device receives the access instruction from the trusted component in the computing device.

510: The storage device obtains the target object based on the object ID carried in the access instruction, and returns the target object to the computing device.

In this embodiment of this disclosure, the storage device determines the storage address of the target object based on the object ID, obtains the target object, and returns the target object to the computing device. In some embodiments, the storage device returns the target object to the trusted component in the computing device. This is not limited herein. In this process, because the access object authentication process is completed in the computing device, the storage device does not need to authenticate whether the tenant corresponding to the access instruction has access permission, so that the access object authentication process becomes a stateless process, resource overheads and a calculation amount of the storage device are reduced, and object access efficiency and scalability of the object storage system are improved while multi-tenant data isolation and security are ensured.

In conclusion, in the access object authentication method provided in this embodiment of this disclosure, the trusted component in the computing device completes the access object authentication process. When the client requests to access the target object, the trusted component receives the object ID and the authentication ID of the target object from the client, to perform, based on the authentication ID, tenant authentication on the tenant to which the client belongs. When the authentication on the tenant to which the client belongs succeeds, the trusted component accesses the storage device based on the object ID of the target object, so that the storage device does not need to perform authentication. This reduces resource overheads and a calculation amount of the storage device, and improves object access efficiency while ensuring multi-tenant data isolation and security.

Figure 15:
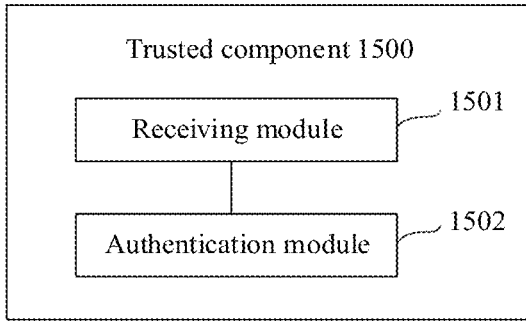
FIG. 15 is a diagram of a structure of a trusted component according to an embodiment of this disclosure.

FIG. 15 is a diagram of a structure of a trusted component 1500 (or an access object authentication apparatus) according to an embodiment of this disclosure. The apparatus may implement some or all functions of the trusted component in the foregoing computing device by using software, hardware, or a combination thereof. The access object authentication apparatus provided in this embodiment of this disclosure can implement the steps performed by the trusted component in the computing device in the foregoing method embodiment. As shown in FIG. 15, the trusted component 1500 or the access object authentication apparatus includes a receiving module 1501 and an authentication module 1502.

The receiving module 1501 is configured to receive an object ID and an authentication ID of a target object from a client in the computing device.

The authentication module 1502 is configured to perform tenant authentication based on the authentication ID, and when authentication on a tenant to which the client belongs succeeds, send an access instruction for accessing the target object to a storage device, where the access instruction includes the object ID of the target object.

In some embodiments, the object ID received by the apparatus from the client is an encrypted object ID, and the object ID included in the access instruction is a decrypted object ID, and the apparatus further includes a decryption module configured to decrypt the encrypted object ID received from the client, to obtain the decrypted object ID used to generate the access instruction.

In some embodiments, the authentication ID cannot be changed by the client.

In some embodiments, the client is run in a VM in the computing device or a container in the computing device.

In some embodiments, the apparatus is used in any one of the following: a DPU, a hypervisor that is run in at least one CPU, and a TEE that is run in the at least one CPU.

In some embodiments, the apparatus is used in a DPU, and the authentication ID is a VF ID of a VF provided by the DPU for the tenant to which the client belongs.

In some embodiments, the client is run in a VM, the authentication ID is a VM ID of the VM, and the authentication ID received by the apparatus from the client is added by the VM, or the client is run in a container, the authentication ID is a container ID of the container, and the authentication ID received by the apparatus from the client is added by the container.

In some embodiments, the apparatus further receives a tenant ID from the client, and the authentication module 1502 is configured to query for a tenant ID corresponding to the authentication ID, and when the found tenant ID matches the tenant ID received by the apparatus from the client, the authentication succeeds.

In some embodiments, the apparatus further receives a first MAC from the client, and the authentication module 1502 is configured to query for a key corresponding to the authentication ID, generate a second MAC, where the second MAC is related to the found key and the object ID of the target object that is received from the client, and when the first MAC matches the second MAC, the authentication succeeds.

In some embodiments, the decryption module is configured to query for a key corresponding to the authentication ID, and decrypt, by using the key, the encrypted object ID received from the client.

It should be noted that, when the access object authentication apparatus provided in the foregoing embodiment performs access object authentication, division of the foregoing functional modules is merely used as an example for description. During actual application, the foregoing functions may be allocated to different functional modules for implementation according to a requirement. In other words, an internal structure of the apparatus is divided into different functional modules to implement all or some of the functions described above. In addition, the access object authentication apparatus provided in the foregoing embodiment and the embodiment of the access object authentication method belong to a same concept. For a specific implementation process, refer to the method embodiment. Details are not described herein again.

An embodiment of this disclosure further provides an object storage system. The system includes a computing device and a storage device.

A trusted component in the computing device is configured to receive an object ID and an authentication ID of a target object from a client in the computing device, perform tenant authentication based on the authentication ID, and when authentication on a tenant to which the client belongs succeeds, send, by the trusted component, an access instruction for accessing the target object to the storage device, where the access instruction includes the object ID of the target object.

The storage device is configured to receive the access instruction from the trusted component in the computing device, obtain the target object based on the object ID carried in the access instruction, and return the target object to the computing device.

In some embodiments, the object ID received by the trusted component from the client is an encrypted object ID, and the object ID included in the access instruction is a decrypted object ID. The trusted component is further configured to decrypt the encrypted object ID received from the client, to obtain the decrypted object ID used to generate the access instruction.

In some embodiments, the authentication ID cannot be changed by the client.

In some embodiments, the client is run in a VM in the computing device or a container in the computing device.

In some embodiments, the trusted component is any one of the following: a DPU, a hypervisor that is run in at least one CPU, and a TEE that is run in the at least one CPU.

In some embodiments, the trusted component is a DPU, and the authentication ID is a VF ID of a VF provided by the DPU for the tenant to which the client belongs.

In some embodiments, the client is run in a VM, the authentication ID is a VM ID of the VM, and the authentication ID received by the trusted component from the client is added by the VM, or the client is run in a container, the authentication ID is a container ID of the container, and the authentication ID received by the trusted component from the client is added by the container.

In some embodiments, the trusted component further receives a tenant ID from the client, and the trusted component is configured to query for a tenant ID corresponding to the authentication ID, and when the found tenant ID matches the tenant ID received by the trusted component from the client, the authentication succeeds.

In some embodiments, the trusted component further receives a first MAC from the client, and the trusted component is configured to query for a key corresponding to the authentication ID, and generate a second MAC, where the second MAC is related to the found key and the object ID of the target object that is received from the client, and when the first MAC matches the second MAC, the authentication succeeds.

In some embodiments, the storage device is further configured to generate the first MAC, where the first MAC is related to the key recorded by the storage device and the object ID of the target object that is recorded by the storage device, and send the first MAC to the client.

In some embodiments, the object ID received by the trusted component from the client is an unencrypted object ID, and the storage device is further configured to create an object ID of the target object, and send the object ID of the target object to the client.

In some embodiments, the object ID received by the trusted component from the client is an encrypted object ID, and the trusted component is further configured to decrypt the encrypted object ID to obtain a decrypted object ID, generate the access instruction, where the access instruction includes the decrypted object ID, and send the access instruction to the storage device.

In some embodiments, the trusted component is configured to query for a key corresponding to the authentication ID, and decrypt, by using the key, the encrypted object ID received from the client.

In some embodiments, the object ID received by the trusted component from the client is an encrypted object ID, and the storage device is further configured to create an object ID of the target object, and encrypt the object ID of the target object to generate an encrypted object ID, and send the encrypted object ID to the client.

It should be noted that information (including but not limited to user equipment information, personal information of a user, and the like), data (including but not limited to data used for analysis, stored data, displayed data, and the like), and signals in this disclosure are used under authorization by the user or full authorization by all parties, and capturing, use, and processing of related data need to conform to related laws, regulations, and standards of related countries and regions. For example, the tenant ID of the target tenant in this disclosure is obtained under full authorization.

In this disclosure, terms such as "first" and "second" are used to distinguish between same items or similar items that have basically same functions. It should be understood that "first", "second", and "$n^{th}$" do not have a logical or time sequential dependency relationship, and do not limit the quantity or the execution sequence. It should further be understood that although terms such as "first" and "second" are used in the following descriptions to describe various elements, these elements should not be limited by the terms. These terms are simply used to distinguish one element from another element. For example, the first field may be referred to as the second field without departing from the scope of the various examples, and similarly, the second field may be referred to as the first field. Both the first field and the second field may be fields, and in some cases, may be separate and different fields.

The term "at least one" in this disclosure means one or more, and the term "a plurality of" in this disclosure means two or more. For example, a plurality of fields are two or more fields.

The foregoing descriptions are merely specific implementations of this disclosure, but are not intended to limit the protection scope of this disclosure. Various equivalent modifications or replacements figured out within the technical scope disclosed in this disclosure shall fall within the protection scope of this disclosure. Therefore, the protection scope of this disclosure shall be subject to the protection scope of the claims.

All or some of the foregoing embodiments may be implemented by software, hardware, firmware, or any combination thereof. When software is used to implement the embodiments, all or some of the embodiments may be implemented in a form of program structure information. The program structure information includes one or more program instructions. When the program instructions are loaded and executed on a computing device, the procedures or functions according to embodiments of this disclosure are all or partially generated.

All or some of the steps in the foregoing embodiments may be implemented by hardware, or may be implemented by a program instructing relevant hardware. The program may be stored in a computer-readable storage medium. The storage medium may include a read-only memory, a magnetic disk, an optical disc, or the like.

As described above, the foregoing embodiments are merely used to describe the technical solutions of this disclosure, but are not intended to limit the technical solutions of this disclosure. Although this disclosure is described in detail with reference to the foregoing embodiments, modifications may still be made to the technical solutions described in the foregoing embodiments, or equivalent replacements may be made to some technical features thereof. These modifications or replacements do not cause the essence of corresponding technical solutions to depart from the scope of the technical solutions of embodiments of this disclosure.

What is claimed is:

1. A method implemented by a trusted component in a computing device, wherein the method comprises:
    receiving, from a client in the computing device, an object identifier (ID) of a target object and an authentication ID of the target object, wherein the client cannot change the authentication ID, and wherein the trusted component is a virtual machine monitor that runs in at least one central processing unit (CPU) or a trusted execution environment (TEE) that runs in the at least one CPU;
    performing, based on the authentication ID, tenant authentication on a tenant corresponding to the client; and
    sending, to a storage device, an access instruction for accessing the target object when the tenant authentication has succeeded, wherein the access instruction comprises the object ID.

2. The method of claim 1, wherein the object ID is an encrypted object ID, wherein the access instruction comprises a decrypted object ID, and wherein the method further comprises decrypting the encrypted object ID to obtain the decrypted object ID to generate the access instruction.

3. The method of claim 2, wherein decrypting the encrypted object ID comprises: querying for a key corresponding to the authentication ID; and decrypting, using the key, the encrypted object ID.

4. The method of claim 1, further comprising: receiving, from the client, a first tenant ID; querying for a second tenant ID corresponding to the authentication ID; and identifying that the tenant authentication has succeeded when the second tenant ID matches the first tenant ID.

5. The method of claim 1, further comprising: receiving, from the client, a first message authentication code (MAC); querying for a key corresponding to the authentication ID; generating a second MAC related to the key and the object ID; and identifying that the tenant authentication has succeeded when the first MAC matches the second MAC.

6. The method of claim 1, wherein the object ID is an unencrypted object ID.

7. The method according to claim 1, wherein the object ID is an encrypted object ID.

8. A computing device comprising:
    a memory configured to store instructions; and
    a trusted component coupled to the memory and configured to:
    receive, from a client in the computing device, an object identifier (ID) of a target object and an authentication ID of the target object, wherein the client cannot change the authentication ID, and wherein the trusted component is a virtual machine monitor that runs in at least one central processing unit (CPU) or a trusted execution environment (TEE) that runs in the at least one CPU:
    perform, based on the authentication ID, a tenant authentication on a tenant corresponding to the client; and
    send, to a storage device, an access instruction for accessing the target object when the tenant authentication has succeeded,
    wherein the access instruction comprises the object ID.

9. The computing device of claim 8, wherein the object ID is an encrypted object ID, wherein the access instruction comprises a decrypted object ID, and wherein the trusted component is further configured to decrypt the encrypted object ID to obtain the decrypted object ID to generate the access instruction.

10. The computing device of claim 9, wherein the trusted component is further configured to: query for a key corresponding to the authentication ID; and decrypt, using the key, the encrypted object ID.

11. The computing device of claim 8, wherein the trusted component is further configured to: receive, from the client, a first tenant ID; query for a second tenant ID corresponding to the authentication ID; and identify that the tenant authentication has succeeded when the second tenant ID matches the first tenant ID.

12. The computing device of claim 8, wherein the trusted component is further configured to: receive, from the client, a first message authentication code (MAC): query for a key corresponding to the authentication ID: generate a second MAC related to the key and the object ID; and identify that the tenant authentication has succeeded when the first MAC matches the second MAC.

13. The computing device of claim 8, wherein the computing device is configured to run a virtual machine (VM), and wherein the VM is configured to run the client.

14. The computing device of claim 8, wherein the computing device is configured to run a container, and wherein the container is configured to run the client.

15. The computing device of claim 8, wherein the trusted component is a data processing unit (DPU) configured to provide a virtual function (VF), and wherein the authentication ID is a VF ID of the VF.

16. The computing device of claim 8, wherein the computing device is configured to run a virtual machine (VM), wherein the VM is configured to run the client and add a VM ID of the VM, and wherein the authentication ID is the VM ID.

17. The computing device of claim 8, wherein the computing device is configured to run a container, wherein the container is configured to run the client and add a container ID of the container, and wherein the authentication ID is the container ID.

18. A computer program product comprising computer executable instructions that are stored on a non-transitory computer-readable medium and that, when executed by at least one processor, cause a trusted component in a computing device to:

receive, from a client in the computing device, an object identifier (ID) of a target object and an authentication ID of the target object, wherein the client cannot change the authentication ID, and wherein the trusted component is a virtual machine monitor that runs in at least one central processing unit (CPU) or a trusted execution environment (TEE) that runs in the at least one CPU:

perform, based on the authentication ID, tenant authentication on a tenant corresponding to the client; and send, to a storage device, an access instruction for accessing the target object when the tenant authentication has succeeded, wherein the access instruction comprises the object ID.

19. The computer program product of claim 18, wherein the object ID is an encrypted object ID wherein the object ID is a decrypted object ID; and the computer executable instructions, when executed by the processor, cause the trusted component to decrypt the encrypted object ID to obtain the decrypted object ID to generate the access instruction.

\* \* \* \* \*